(12) United States Patent
Kohno et al.

(10) Patent No.: US 8,320,837 B2
(45) Date of Patent: *Nov. 27, 2012

(54) RADIO COMMUNICATION DEVICE, AUDIO DATA REPRODUCING METHOD AND PROGRAM

(75) Inventors: Michinari Kohno, Tokyo (JP); Kenji Yamane, Tokyo (JP); Yasushi Okumura, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 220 days.

This patent is subject to a terminal disclaimer.

(21) Appl. No.: 12/741,541

(22) PCT Filed: Aug. 26, 2008

(86) PCT No.: PCT/JP2008/065167
§ 371 (c)(1),
(2), (4) Date: May 5, 2010

(87) PCT Pub. No.: WO2009/063669
PCT Pub. Date: May 22, 2009

(65) Prior Publication Data
US 2010/0261432 A1 Oct. 14, 2010

(30) Foreign Application Priority Data

Nov. 15, 2007 (JP) ................................ 2007-297154
Apr. 8, 2008 (JP) ................................ 2008-100619

(51) Int. Cl.
*H04B 17/00* (2006.01)
(52) U.S. Cl. .................... 455/67.11; 455/67.13; 455/68
(58) Field of Classification Search .............. 455/41.2, 455/67.11, 67.13, 68, 456.1, 456.2, 456.3, 455/456.5; 342/450, 458
See application file for complete search history.

(56) References Cited

U.S. PATENT DOCUMENTS 7,437,132 B2 * 10/2008 Hanabusa et al. ............. 455/130
(Continued)

FOREIGN PATENT DOCUMENTS

EP 1 489 432 A1 12/2004
(Continued)

OTHER PUBLICATIONS

International Search Report dated Oct. 7, 2008, in PCT/JP2008/065167.

(Continued)

*Primary Examiner* — Tuan H Nguyen
(74) *Attorney, Agent, or Firm* — Finnegan, Henderson, Farabow, Garrett & Dunner LLP

(57) ABSTRACT

Provided is a radio communication device including a communication unit, a memory unit capable of storing first audio data, a distance estimation unit that estimates a distance from an external device serving as a transmission source which transmits a radio signal based on a predetermined condition related to a field intensity and a noise component of the radio signal received by the communication unit, a communication control unit that controls the communication unit to transmit an audio data transmission request addressed to the external device serving as the transmission source based on the estimated distance estimated by the distance estimation unit, when the first audio data is being reproduced, and a reproduction control unit that adjusts a reproducing volume of the first audio data and a reproducing volume of second audio data, when the first audio data is being reproduced and the communication unit receives a radio signal corresponding to the second audio data transmitted from the external device serving as the transmission source in response to the transmission request.

18 Claims, 20 Drawing Sheets

U.S. PATENT DOCUMENTS

| | | | |
|---|---|---|---|
| 7,523,756 B2 * | 4/2009 | Minai et al. | 128/899 |
| 2004/0214565 A1 | 10/2004 | Shinmei | |
| 2005/0209921 A1 | 9/2005 | Roberts et al. | |
| 2005/0228613 A1 | 10/2005 | Fullerton et al. | |
| 2006/0267841 A1 | 11/2006 | Lee et al. | |
| 2007/0060170 A1 | 3/2007 | Fukui | |

FOREIGN PATENT DOCUMENTS

| | | |
|---|---|---|
| EP | 1 811 426 A2 | 7/2007 |
| JP | 05-167471 A | 7/1993 |
| JP | 2002-300545 A | 10/2002 |
| JP | 2002-300548 A | 10/2002 |
| JP | 2002-325211 A | 11/2002 |
| JP | 2004-328542 A | 11/2004 |
| JP | 2005-301428 A | 10/2005 |
| JP | 2006-081036 A | 3/2006 |
| JP | 2006-300918 | 11/2006 |
| JP | 2007-071816 A | 3/2007 |
| JP | 2007-189726 A | 7/2007 |

OTHER PUBLICATIONS

Extended European Search Report dated (mailed) Jul. 20, 2012, issued in related Application No. 08850303.2-2220/2211566, PCT/JP2008070788.

Extended European Search Report dated (mailed) Jul. 17, 2012, issued in related Application No. 08850127.5-2220 / 2221634, PCT/JP2008065362.

Extended European Search Report dated (mailed) Jul. 5, 2012, issued in related Application No. 08792400.7-2220/2219046, PCT/JP2008064467.

Japanese Office Action dated Jul. 10, 2012, issued in related Japanese Application No. 2008-082884 (4 pages).

Japanese Office Action dated (mailed) Jun. 19, 2012, issued in related Japanese Application No. 2008-060330 (4 pages).

* cited by examiner

| DEVICE INFORMATION | EVALUATION FORMULA |
|---|---|
| Model 001 | EVALUATION FORMULA 1 |
| Model 002 | EVALUATION FORMULA 2 |
| Model 003 | EVALUATION FORMULA 3 |
| Model 004 | EVALUATION FORMULA 4 |

RADIO COMMUNICATION DEVICE, AUDIO DATA REPRODUCING METHOD AND PROGRAM

TECHNICAL FIELD

The present invention relates to a radio communication device, an audio data reproducing method and a program.

BACKGROUND ART

In recent years, a portable radio communication device having an audio data reproducing function and a radio communication function, which includes a mobile phone having a music reproducing function, a music player such as WALK MAN®, a portable game machine such as PlayStation Portable® for example, has been widely used. Such a radio communication device can perform radio communication by a communication mode called an infrastructure mode in which radio communication is performed via a wireless LAN access point (wireless Local Area Network access point) or a communication mode called an ad hoc mode in which radio communication devices directly communicate by radio without the wireless LAN access point. Thus, the radio communication device can access to a server on the Internet via the wireless LAN access point and download audio data (music data, for example) stored in the server or can obtain or exchange audio data by directly transmitting/receiving audio data to/from other radio communication device.

Here, it is known that, in an ideal space, a field intensity of a radio signal transmitted from the radio communication device or the wireless LAN access point varies inversely with the square or the cube of the distance in a vicinity of the radio communication device serving as a signal transmission source and varies inversely with the distance out of the vicinity of the radio communication device. The characteristic of the field intensity of the radio signal is effective with a wireless LAN (Local Area Network) standard such as IEEE 802.11b and IEEE 802.11g.

In this point of view, a technology for estimating a distance between radio communication devices using the characteristic of a field intensity of a radio signal has been developed. The technology for estimating the distance between radio communication devices using the characteristic of a field intensity of a radio signal is seen in Patent Literature 1, for example.

Patent Literature 1: JP 2006-300918 (A)

DISCLOSURE OF INVENTION

Technical Problem

However, a field intensity of a radio signal is actually affected by interference fading, polarization fading, skip fading and the like. In general, the field intensity of the radio signal continuously varies even when the distance from the radio communication device serving as a signal transmission source is constant. Therefore, in a conventional radio communication device, it is thus difficult to estimate a distance between radio communication devices with accuracy.

Here, according to a conventional radio communication device, when an estimated distance between the radio communication devices is widely different from the actual distance, a case where audio data (music data, for example) stored in a server cannot be downloaded or audio data cannot be obtained or exchanged by directly transmitting/receiving the audio data to/from other radio communication device may happen.

Further, according to a conventional radio communication device, it is difficult to estimate a distance between radio communication devices with accuracy, so that a reproduction of audio data obtained from other radio communication device in a reproducing manner based on the distance between the radio communication devices cannot be expected.

The present invention is made in view of the above-mentioned issue, and aims to provide a radio communication device, an audio data reproducing method and a program which are novel and improved, and which are capable of obtaining audio data from other radio communication device according to a distance from the radio communication device and reproducing the obtained audio data in a reproducing manner based on the distance from the radio communication device.

Technical Solution

According to the first aspect of the present invention in order to achieve the above-mentioned object, there is provided a radio communication device including: a communication unit that performs radio communication with an external device, a memory unit capable of storing first audio data, a distance estimation unit that estimates a distance from the external device serving as a transmission source which transmits a radio signal based on a predetermined condition related to a field intensity and a noise component of the radio signal received by the communication unit, a communication control unit that controls the communication unit to transmit an audio data transmission request to the external device serving as a transmission source based on the estimated distance estimated by the distance estimation unit when the first audio data stored in the memory unit is being reproduced, and a reproduction control unit that adjusts a reproducing volume of the first audio data and a reproducing volume of second audio data that is decoded from a radio signal, when the first audio data stored in the memory unit is being reproduced and the communication unit receives a radio signal corresponding to the second audio data transmitted from the external device serving as a transmission source in response to the transmission request.

With the above configuration, audio data can be obtained from other radio communication device according to the distance between the radio communication devices and the obtained audio data can be reproduced by a reproducing manner based on the distance between the radio communication devices.

Further, the distance estimation unit may include: a measurement unit that measures the field intensity of the radio signal, a determination unit that determines whether the radio signal satisfies the predetermined condition related to the noise component, and an estimation unit that estimates the distance from the external device based on the determination result by the determination unit and the field intensity measured by the measurement unit.

Further, the determination unit may determine that the predetermined condition is satisfied when the noise component of the radio signal is greater than a lower limit set value and lower than an upper limit set value.

Further, in response to a reception of a radio signal in the communication unit, the communication control unit may control the communication unit to transmit a radio signal addressed to the external device serving as the transmission source which transmits the radio signal.

Further, the communication unit may receive device information indicating a transmitting power of the radio signal of the external device, which is transmitted from the external device, and may estimate the distance from the external device serving as the transmitting source of the radio signal using the device information.

Further, the estimation unit may calculate an average value of field intensities of radio signals which are determined to satisfy the predetermined condition by the determination unit, determine whether the average value is included in which of defined average value ranges, and determine that the distance from the external device serving as the transmission source of the radio signal to be a distance corresponding to the average value range which is determined to include the average value.

Further, the average value ranges and an average value calculation may vary by the device information.

Further, the device information may indicate a transmitting power of the radio signal of the external device serving as the transmission source of the radio signal or a type of the external device serving as the transmission source of the radio signal.

Further, when the communication unit receives a radio signal corresponding to the second audio data in response to the transmission request, the reproduction control unit may adjust the reproducing volume of the first audio data to gradually turn down in a predetermined period of time and adjust the reproducing volume of the second audio data to gradually turn up in a predetermined period of time in synchronization with the adjustment of the reproducing volume of the first audio data.

Further, when the estimated distance from the external device which transmits the second audio data becomes greater than a predetermined threshold value, the reproduction control unit may adjust the reproducing volume of the first audio data to gradually turn up in a predetermined period of time and adjust the reproducing volume of the second audio data to gradually turn down in a predetermined period of time in synchronization with the adjustment of the reproducing volume of the first audio data.

Further, the reproduction control unit may measure a first time period in a case where the estimated distance from the external device which transmits the second audio data is shorter than a predetermined threshold value, compare the measured first time period with a second time period taken to adjust the reproducing volume of the first audio data and with a third time period taken to adjust the reproducing volume of the second audio data, when the estimated distance from the external device which transmits the second audio data becomes greater than the predetermined threshold value, and adjust the reproducing volume of the first audio data and the reproducing volume of the second audio data, if the first time period is longer than the second time period and than the third time period.

Further, the reproduction control unit may adjust the reproducing volume of the first audio data and the reproducing volume of the second audio data in synchronization.

Further, the reproduction control unit may adjust the reproducing volume of the first audio data to gradually turn down in a predetermined period of time when the communication unit receives a radio signal corresponding to the second audio data in response to the transmission request.

Further, the reproduction control unit may adjust the reproducing volume of the second audio data to gradually turn up in a predetermined period of time.

Further, the communication control unit may control the communication unit to transmit a request for determination condition information to selectively transmit the transmission request, and control the communication unit to selectively transmit the audio data transmission request based on the estimated distance estimated by the distance estimation unit and the determination condition information transmitted from the external device in response to the request for the determination condition information.

Further, when the distance estimation unit estimates respective distances from a plurality of external devices, the communication control unit may control to selectively transmit the transmission request to one of the plurality of external devices based on the estimated distance estimated by the distance estimation unit.

Further, according to the second aspect of the present invention in order to achieve the above-mentioned object, there is provided an audio data reproducing method applicable to a radio communication device including a communication unit for performing radio communication with one or more external devices and a memory unit for storing first audio data, including the steps of: receiving a radio signal transmitted from the external device, estimating a distance from the external device serving as a transmission source which transmits the radio signal based on a predetermined condition related to a field intensity and a noise component of the radio signal received in the step of receiving, transmitting an audio data transmission request addressed to the external device serving as the transmission source based on the estimated distance estimated in the step of estimating, when the first audio data stored in the memory unit is being reproduced, and adjusting a reproducing volume of the first audio data and a reproducing volume of second audio data decoded from the radio signal, when the communication unit receives the radio signal corresponding to the second audio data transmitted from the external device serving as the transmission source in response to the transmission request transmitted in the step of transmitting.

With the above method, audio data can be obtained from other radio communication device according to the distance between the radio communication devices and the obtained data can be reproduced by a reproducing manner based on the distance between the radio communication devices.

Further, according to the third aspect of the present invention in order to achieve the above-mentioned object, there is provided a program applicable to a radio communication device including a communication unit for performing radio communication with one or more external devices and a memory unit for storing first audio data, the program for causing a computer to perform the steps of: receiving a radio signal transmitted from the external device, estimating a distance from the external device serving as a transmission source which transmits the radio signal based on a predetermined condition related to a field intensity and a noise component of the radio signal received in the step of receiving, transmitting an audio data transmission request addressed to the external device serving as the transmission source based on the estimated distance estimated in the step of estimating, when the first audio data stored in the memory unit is being reproduced, and adjusting a reproducing volume of the first audio data and a reproducing volume of second audio data decoded from the radio signal, when the communication unit receives the radio signal corresponding to the second audio data transmitted from the external device serving as the transmission source in response to the transmission request transmitted in the step of transmitting.

With the above program, audio data can be obtained from other radio communication device according to the distance between the radio communication devices and the obtained data can be reproduced by a reproducing manner based on the distance between the radio communication devices.

Advantageous Effects

According to the present invention, audio data can be obtained from other radio communication device according to the distance between the radio communication devices and the obtained data can be reproduced by a reproducing manner based on the distance between the radio communication devices.

Figure 1:
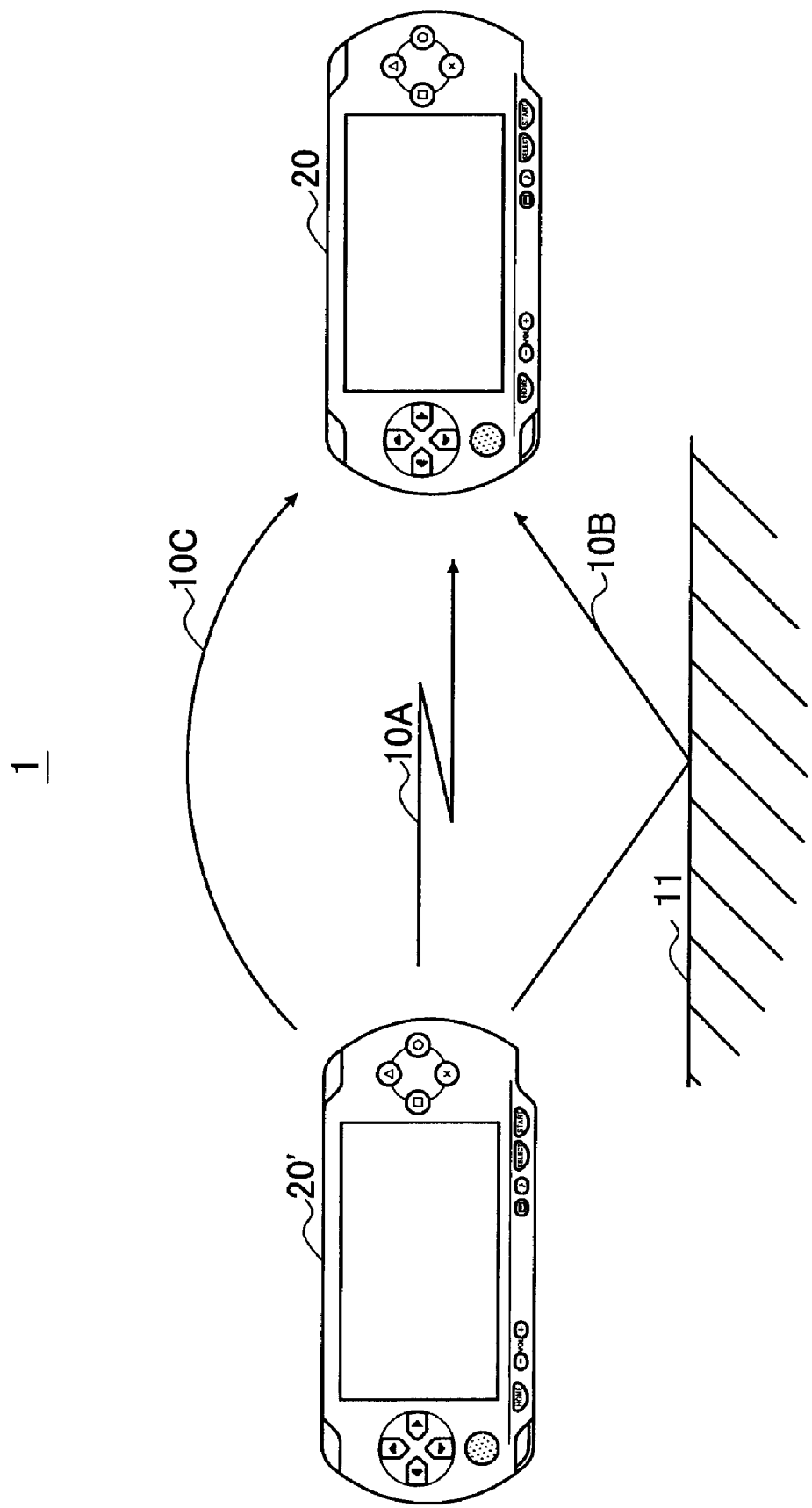
FIG. 1 is an explanatory view showing a configuration of a radio communication system according to an embodiment of the present invention.

EXPLANATION OF REFERENCE 20, 20', 21A, 21B Radio communication device
216 Communication unit
220 Field intensity measurement unit
224 Noise floor measurement unit
228 Memory unit
232 Estimation unit
236 Determination unit
244, 252 Communication control unit
250 Distance estimation unit
254 Reproduction control unit

BEST MODE FOR CARRYING OUT THE INVENTION

Hereinafter, preferred embodiments of the present invention will be described in detail with reference to the appended drawings. Note that, in this specification and the drawings, elements that have substantially the same function and structure are denoted with the same reference signs, and repeated description is omitted.

Further, "Description of Embodiments" will be described in order of the following items.

[1] Distance estimation manner in radio communication system according to embodiment of present invention
[1-A] Outline of distance estimation manner in radio communication system
[1-B] Radio communication device constituting radio communication system (distance estimation)
[1-B-1] Hardware configuration of radio communication device
[1-B-2] Functions related to distance estimation of radio communication device
[1-B-3] Operation related to distance estimation of radio communication device
[1-C] Conclusion of distance estimation
[2] Radio communication system according to embodiment of present invention
[2-A] Outline of audio data reproducing method in radio communication system
[2-B] Radio communication device constituting radio communication system
[2-B-1] Audio data reproducing method
[2-B-2] Functions of radio communication device
[2-C] Conclusion

[1] Distance Estimation Manner in Radio Communication System According to Embodiment of the Present Invention A manner for estimating a distance between radio communication devices according to an embodiment of the present invention will be described before explaining a method for reproducing audio data in a radio communication system according to an embodiment of the present invention.

[1-A] Outline of Distance Estimation Manner in Radio Communication System

FIG. 1 is an explanatory view showing a configuration of the radio communication system 1 according to the embodiment of the present invention. As shown in FIG. 1, the radio communication system 1 according to the present embodiment includes a plurality of radio communication devices 20 and 20'.

The radio communication devices 20 and 20' are capable of transmitting/receiving radio signals including various data (streaming data, distance measurement packets and the like) to/from each other. The various data include audio data such as music, lectures and radio programs, video data such as movies, TV programs, video programs, photographs, documents, paintings and graphic charts or other any data such as games and software.

Further, in FIG. 1, portable game machines are shown as examples of the radio communication devices 20 and 20'; however, the radio communication devices 20 and 20' are not limited to those portable game machines. For example, the radio communication devices 20 and 20' may be information processing devices such as PCs (Personal Computers), household video processors (DVD recorder, videocassette recorder and the like), mobile phones, PHSs (Personal Handyphone Systems), portable music players, portable video processors, PDAs (Personal Digital Assistants), household game machines and household electric appliances.

Here, the radio communication devices 20 and 20' may perform radio communication using a frequency bandwidth of 2.4 GHz that is specified in IEEE 802.11b or may perform radio communication using a frequency bandwidth specified in IEEE 802.11a, g and n. Further, the radio communication devices 20 and 20' may operate using ZigBee that is specified in IEEE 802.15.4. Further, FIG. 1 shows the radio communication system 1 of an ad-hoc mode in which the radio communication devices 20 and 20' directly communicate with each other; however, the radio communication system 1 may be in an infrastructure mode in which the radio communication devices 20 and 20' communicate via a base station. Furthermore, in the radio communication system 1, in addition to point-to-point radio communication but also point-to-multipoint or multipoint-to-multipoint radio communication can be realized.

The field intensity of a radio signal transmitted from the radio communication device 20 or 20' are affected by interference fading, polarization fading, skip fading or the like. Interference fading is a phenomenon in which radio signals, which are propagated via a plurality of paths and come to a receiving point, interfere with each other at the receiving point. Further, polarization fading is a phenomenon in which a rotation of a plane of polarization occurs during a propagation of radio signals and radio waves having different planes of polarization interfere with each other at a receiving point. Furthermore, skip fading is a phenomenon in which an interference occurs due to an affect of the ionosphere around the earth.

For example, as shown in FIG. 1, when the radio communication device 20' transmits a radio signal, the radio communication device 20 receives the radio signal as a direct wave 10A, a reflected wave 10B (reflected by a subject 11) or a diffracted wave 10C, for example.

Thus, the field intensity of the radio signal received by the radio communication device 20 from the radio communication device 20' constantly varies. Particularly, since the portable game machines described as examples of the radio communication devices 20 and 20' have a low transmitting power, those portable game machines are easily affected by fading. Thus, a radio communication device cannot estimate an accurate distance from the transmission source device of the radio signal by using the field intensity of all radio signals received in a predetermined period of time.

Thus, the radio communication device 20 according to the embodiment of the present invention estimates the distance from the transmission source device of the radio signal with higher accuracy by estimating the distance based on a predetermined condition related to a field intensity and a noise component of the radio signal received. The radio communication device 20 will be described in detail with reference to FIGS. 2 to 15.

[1-B] Radio Communication Device Constituting Radio Communication System (Distance Estimation)

[1-B-1] Hardware Configuration of Radio Communication Device

Figure 2:
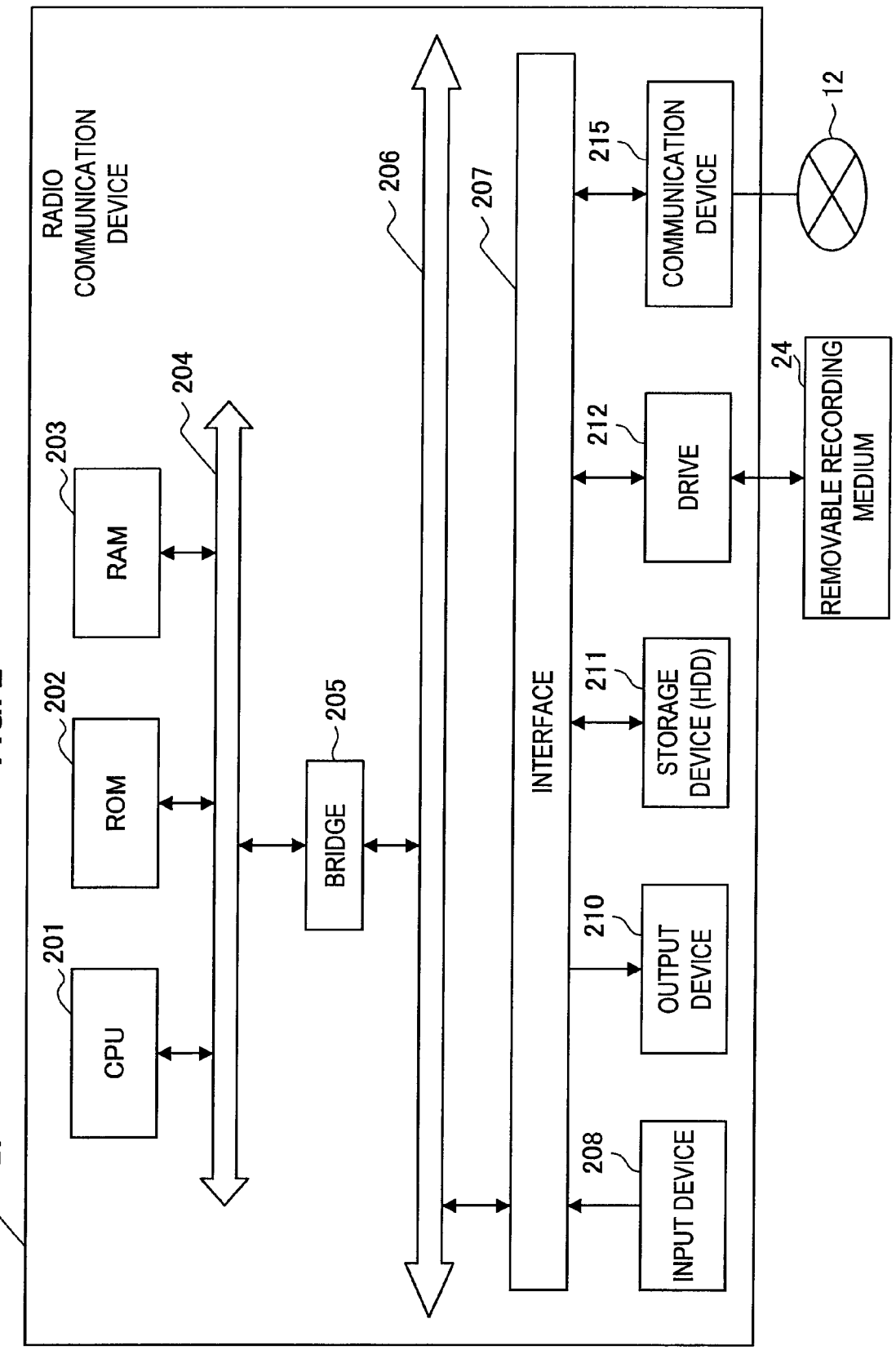
FIG. 2 is a block diagram showing an example of a hardware configuration of a radio communication device according to the embodiment of the present invention.

FIG. 2 is a block diagram showing a hardware configuration of the radio communication device 20 according to the embodiment of the present invention. The radio communication device 20 includes a CPU (Central Processing Unit) 201, a ROM (Read Only Memory) 202, a RAM (Random Access Memory) 203, a host bus 204, a bridge 205, an external bus 206, an interface 207, an input device 208, an output device 210, a storage device (HDD) 211, a drive 212 and a communication device 215.

The CPU 201 functions as an arithmetic processing device and a control device, and controls the overall operation of the radio communication device 20 according to various programs. Further, the CPU 201 can be a microprocessor. The ROM 202 stores programs, arithmetic parameters and the like which are used by the CPU 201. The RAM 203 temporarily stores programs used by the CPU 201 and parameters and the like which varies as appropriate during an implementation of the programs. These are connected to one another by the host bus 204 composed of a CPU bus and the like.

The host bus 204 is connected to the external bus 206 such as a PCI (Peripheral Component Interconnect/Interface) bus via the bridge 205. Note that the host bus 204, bridge 205 and external bus 206 do not have to be separately provided and those functions may be mounted in a single bus.

The input device 208 is composed of an input means, which is used by a user to input information, such as a mouse, a keyboard, a touch panel, a button, a microphone, a switch and a lever, and an input control circuit for generating input signals based of user's input and outputting to the CPU 201. By operating the input device 208, the user of the radio communication device 20 can input various data and instruct processing operation to the radio communication device 20.

The output device 210 is composed of a display device such as a CRT (Cathode Ray Tube) display device, a liquid crystal display (LCD) device, an OLED (Organic Light Emitting Diode) device and a lamp, and an audio output device such as a speaker and a headphone. The output device 210 outputs a reproduced content, for example. Specifically, the display device displays various information such as reproduced video data and the like in form of texts or images. On the other hand, the audio output device converts reproduced sound data and the like to sound and outputs the sound.

The storage device 211 is a data storing device composed as an example of a memory unit of the radio communication device 20 according to the present embodiment. The storage device 211 may include a memory medium, a recording device for recording data to the memory medium, a readout device for reading data from the memory medium, a deletion device for deleting data recorded in the memory medium, and the like. The storage device 211 is composed of a HDD (Hard Disk Drive) for example. The storage device 211 drives a hard disk and stores programs and various data which are executed by the CPU 201. Further, in the storage device 211, later described field intensity, noise floor and the like are recorded in association with users.

The drive 212 is a reader/writer for a memory medium and internally mounted in or externally connected to the radio communication device 20. The drive 212 reads information from an attached magnetic disc, optical disc, magnetic-optical disc, or a removable recording memory 24 such as a semiconductor memory, and outputs to the RAM 203.

The communication device 215 is a communication interface composed of a communication device for connecting to a communication network 12, for example. Further, the communication device 215 may be a communication device for a wireless LAN, a communication device for a wireless USB, or a wired communication device for a wired communication. The communication device 215 transmits/receives radio signals to/from other radio communication device 20'.

Here, the hardware configuration of the radio communication device 20' can substantially be the same as the hardware configuration of the above described radio communication device 20, so the detailed description will be omitted.

[1-B-2] Functions Related to Distance Estimation of Radio Communication Device

The hardware configuration of the radio communication device 20 has been described with reference to FIG. 2. Next, functions relating to the distance estimation of radio communication device 20 will be described.

Figure 3:
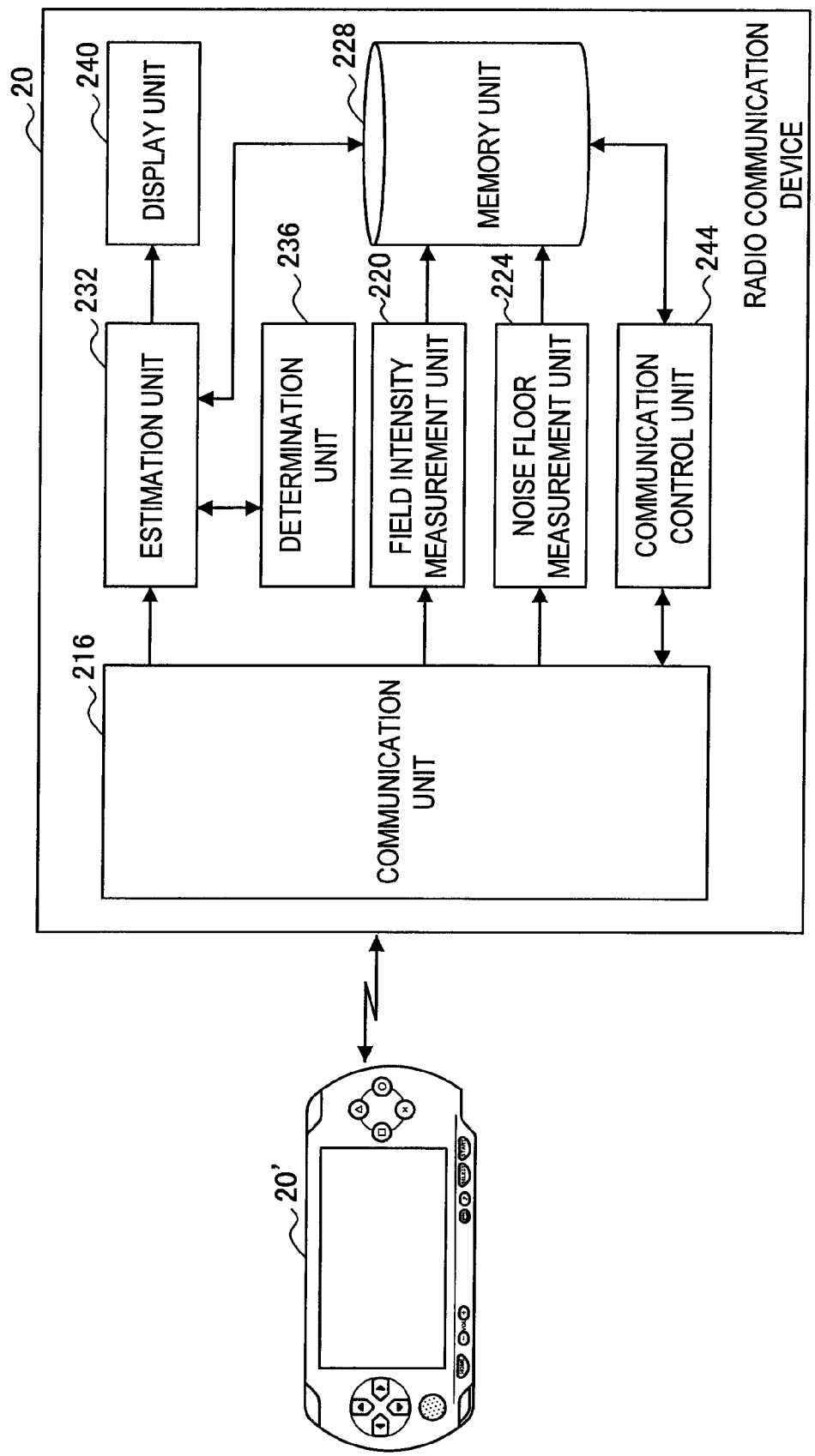
FIG. 3 is a functional block diagram showing a configuration related to a distance estimation in the radio communication device according to the embodiment of the present invention.

FIG. 3 is a functional block diagram showing the configuration related to the distance estimation in the radio communication device 20 according to the embodiment of the present invention. As shown in FIG. 3, the radio communication device 20 includes a communication unit 216, a field intensity measurement unit 220, a noise floor measurement unit 224, a memory unit 228, an estimation unit 232, a determination unit 236, a display unit 240 and a communication control unit 244.

The communication unit 216 is an interface for transmitting/receiving radio signals such as a distance measurement packet or streaming data to/from other radio communication device 20' and has functions as a transmission unit and a reception unit.

The other radio communication device 20' generates a distance measurement packet and periodically transmits to the radio communication device 20. The distance measurement packet is a packet used by the radio communication device 20 to measure the distance between the radio communication device 20 and the radio communication device 20'. When there are data to be transmitted from the other radio communication device 20' to the radio communication device 20, the data can be included in the distance measurement packet. Further, the distance measurement packet has a data amount equal to or greater than 1 byte. Note that the radio communication device 20 can estimate the distance from the radio communication device 20' based on streaming data without using the distance measurement packet.

Further, the communication unit 216 receives device information that indicates a transmitting power of the radio communication device 20' before receiving the distance measurement packet.

Figure 4:
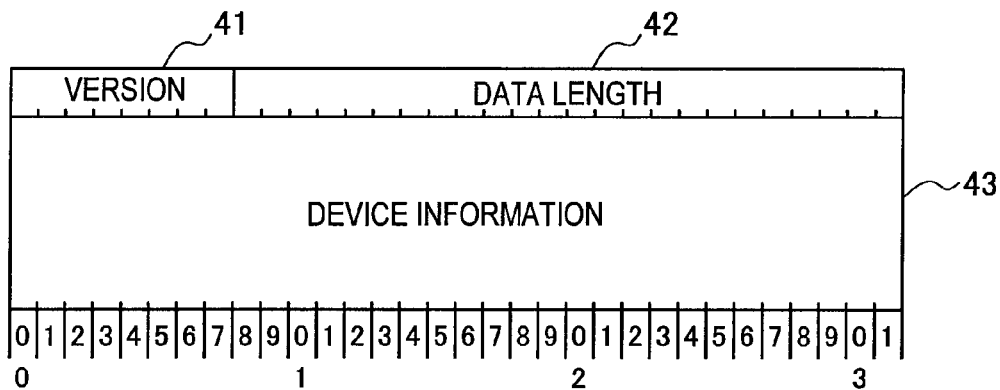
FIG. 4 is an explanatory view showing a configuration example of a packet including device information according to the embodiment of the present invention.

FIG. 4 is an explanatory view showing an example of a packet configuration including device information according to the embodiment of the present invention. This packet includes, as shown in FIG. 4, a version 41 which is 8 bytes in length and is a value of format version of the packet, a data length 42 of the packet and device information 32.

Figure 5:
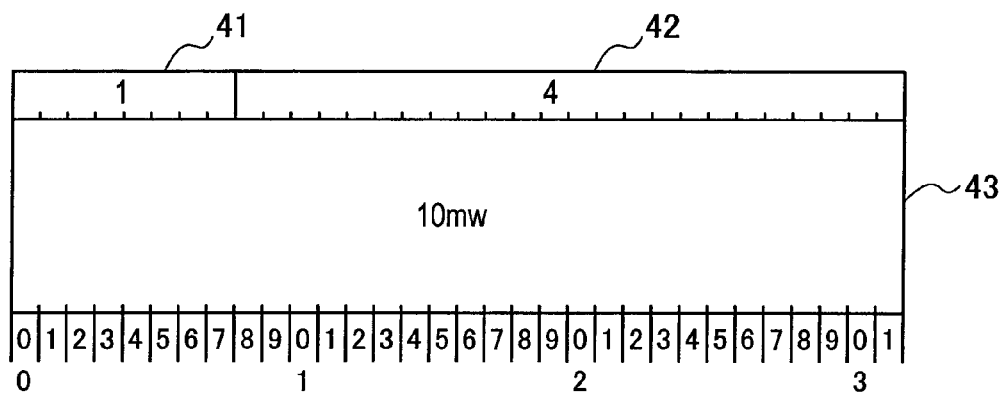
FIG. 5 is an explanatory view showing an illustrative example of the packet including device information according to the embodiment of the present invention.
Figure 6:
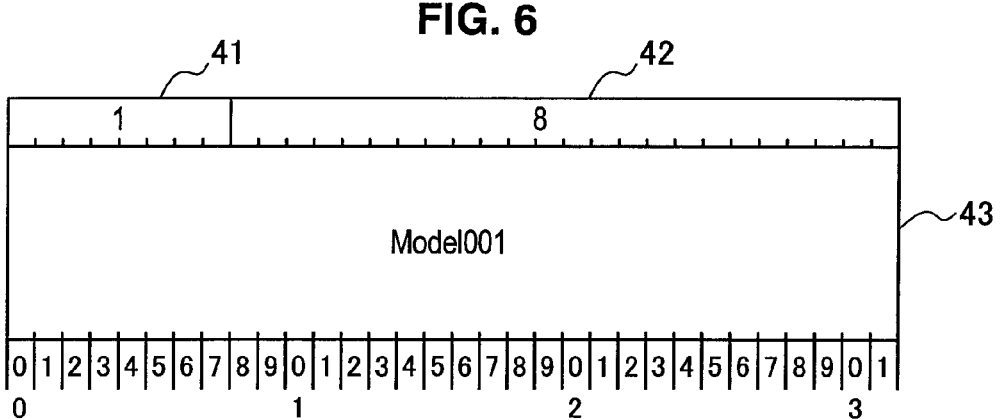
FIG. 6 is an explanatory view showing an illustrative example of the packet including device information according to the embodiment of the present invention.

FIGS. 5 and 6 are explanatory views showing illustrative examples of a packet including device information according to the embodiment of the present invention. In the example shown in FIG. 5, the version 41 is "1," the data length 42 is "4," and the device information 32 is "10 mw." The "10 mw" written as the device information 32 is a transmitting power of the radio communication device 20' upon transmitting a radio signal.

Further, in the example shown in FIG. 6, the version 41 is "1," the data length 42 is "8," and the device information 32 is "Model001." The "Model001" written as the device information 32 is an antenna type of the radio communication device 20' or radio communication device 20'. Base on the type, a transmitting power of the radio communication device 20' can be specified.

As described above, since the communication unit 216 receives device information including a transmitting power or a type of the radio communication device 20' in advance, the estimation unit 232 is allowed to estimate the distance from the radio communication device 20' according to the content of the device information. Note that the format of the packet including the device information is not limited to the example shown in FIG. 4 and any format such as a serial number of the radio communication device 20' can be used if it can be recognized between applications (programs) of the radio communication device 20 and radio communication device 20'.

The field intensity measurement unit 220 has a function as a measurement unit for measuring a field intensity (reception intensity) of the distance measurement packet received by the communication unit 216. The field intensity measurement unit 220 may obtain the field intensity from an API (Application Program Interface), a function, a driver applicable to a wireless hardware, or the like.

The noise floor measurement unit 224 measures a noise floor indicating a level of noise included in the distance measurement packet received by the communication unit 216. In general, differently from an S/N (signal-to-noise) ratio, a greater value of the noise floor indicates a worse radio wave environment (a larger noise component) and a smaller value indicates a better radio wave environment (a smaller noise component). The noise floor measurement unit 224 may obtain the noise floor from an API (Application Program Interface), a function, a driver applicable to a wireless hardware, or the like.

The memory unit 228 stores the field intensity of the distance measurement packet that is measured by the field intensity measurement unit 220 and the noise floor value of the distance measurement packet that is measured by the noise floor measurement unit 224. Further, the memory unit 228 stores the device information received by the communication unit 216 in advance in association with a later described threshold value N and threshold value F, an evaluation formula or the like.

Here, the memory unit 228 may be a memory medium of a nonvolatile memory such as an EEPROM (Electrically Erasable Programmable Read-Only Memory) and an EPROM (Erasable Programmable Read Only Memory), a magnetic disc such as a hard disk and a disctype magnetic substance disk, an optical disc such as a CD-R (Compact Disc Recordable), a /RW (ReWritable), a DVD-R (Digital Versatile Disc Recordable) a /RW/+R/+RW/RAM (Ramdam Access Memory) and a BD (Blu-Ray Disc®)-R/BD-RE, or an MO (Magneto Optical) disc.

The estimation unit 232 estimates a distance from the radio communication device 20' using the field intensity and the noise floor value, which is determined by the determination unit 236 to satisfy a predetermined condition, among the field intensities and noise floor values stored in memory unit 228. Hereinafter, a determination by the determination unit 236 will be described after a specific description of the functions of the estimation unit 232.

Firstly, the estimation unit 232 maintains a pair of a field intensity and a noise floor value which is determined by the determination unit 236 to satisfy a predetermined condition as a distance measurement database. Then, when the following condition A is satisfied, a distance measurement evaluation value is calculated.

(Condition A)
1. A set period has passed.
2. The number of pairs of the field intensity and noise floor value is increased by a fixed number.
3. The accumulated number of pairs of the field intensity and noise floor value excesses a predetermined value.
One of the above 1 to 3 or a combination.

Figures 7, 8:
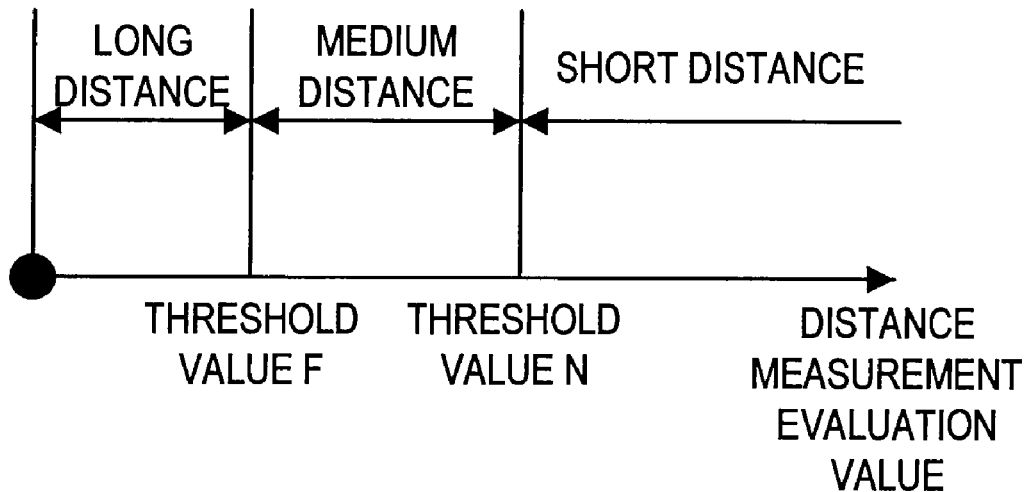
FIG. 7 is an explanatory view showing a relationship between a distance measurement evaluation value and an estimated distance according to the embodiment of the present invention.
FIG. 8 is an explanatory view showing an example in which device information and an evaluation formula are associated with each other and stored in a memory unit according to the embodiment of the present invention.

Note that the distance measurement evaluation value may be an average value of field intensities in the distance measurement database or a latest field intensity. As shown in FIG. 7, for example, the estimation unit 232 estimates the distance between the radio communication devices 20 and 20' based on the magnitude of the distance measurement evaluation value.

FIG. 7 is an explanatory view showing a relationship between distance measurement evaluation values and estimated distances according to the embodiment of the present invention. As shown in FIG. 7, when the distance measurement evaluation value is smaller than the threshold value F, the estimation unit 232 estimates that the distance between the radio communication devices 20 and 20' is a long distance. Further, when the distance measurement evaluation value is greater than the threshold value N, the estimation unit 232 estimates that the distance between the radio communication devices 20 and 20' is a short distance. Further, when the distance measurement evaluation value is equal to or greater than the threshold value F or equal to or smaller than the threshold value N, the estimation unit 232 estimates that the distance between the radio communication devices 20 and 20' is a medium distance.

Note that the threshold value N and threshold value F may be stored in association with device information in the memory unit 228. In this case, the estimation unit 232 may extract the threshold value N and threshold value F from the memory unit 228, which correspond to the device information received from the radio communication device 20' in advance. It is assumed that the threshold value N and threshold value F associated with device information that indicates a relatively high transmitting power tend to be relatively great values.

Further, as a substitute for the threshold value N and threshold value F, a evaluation formula for calculating a distance measurement evaluation value may be associated with the device information and stored in the memory unit 228 as shown in FIG. 8.

FIG. 8 is an explanatory view showing an example in which device information and evaluation formulas are associated and stored in the memory unit 228 according to the embodiment of the present invention. More specifically, device information "Model001" is associated with an evaluation formula 1 and device information "Model002" is associated with an evaluation formula 2. Device information "Model003" and device information "Model004" are also associated with evaluation formulas.

For example, the evaluation formula 1 may be (added value of latest three field intensities)/3, and the evaluation formula 2 may be (added value of latest three field intensities)/4.

Since each radio communication device 20' has different antenna shape, product shape, transmitting power or the like, in the radio communication device 20, it has been difficult to accurately estimate the distance between the radio communication devices 20 and 20' based on only the field intensity. Thus, when the device information is associated with a threshold value N, a threshold value F, and an evaluation formula and stored in the memory unit 228, the estimation unit 232 can perform a distance estimation for the radio communication device 20'.

The determination unit 236 determines whether the pair of the field intensity and noise floor value stored in the memory unit 228 satisfy a predetermined condition. Here, when the noise floor value is greater than an upper limit set value, it is assumed that the reception environment for receiving the distance measurement packet by the communication unit 216 is remarkably deteriorated. Further, when the noise floor value is lower than a lower limit set value, it is assumed that the reception environment for receiving the distance measurement packet by the communication unit 216 is excessively good. Thus, when the noise floor value is greater than the lower limit set value and lower than the upper limit set value, it is assumed that the reception environment for receiving the distance measurement packet by the communication unit 216 is almost in a steady state.

Thus, among the pairs of the field intensity and noise floor value, the determination unit 236 determines that a pair having a noise floor value that is equal to or greater than the lower limit set value and equal to or lower than the upper limit set value satisfies the predetermined condition and adds the pair to the distance measurement database maintained by the estimation unit 232. In other words, the determination unit 236 filters a pair of the field intensity and noise floor value that is to be used by the estimation unit 232 among the pairs of the field intensity and noise floor value stored in the memory unit 228. Note that the determination unit 236 may perform filtering when a pair of the field intensity and noise floor is recorded in the memory unit 228. A manner of filtering by the determination unit 236 will be described with reference to FIGS. 9 and 10.

Figure 9:
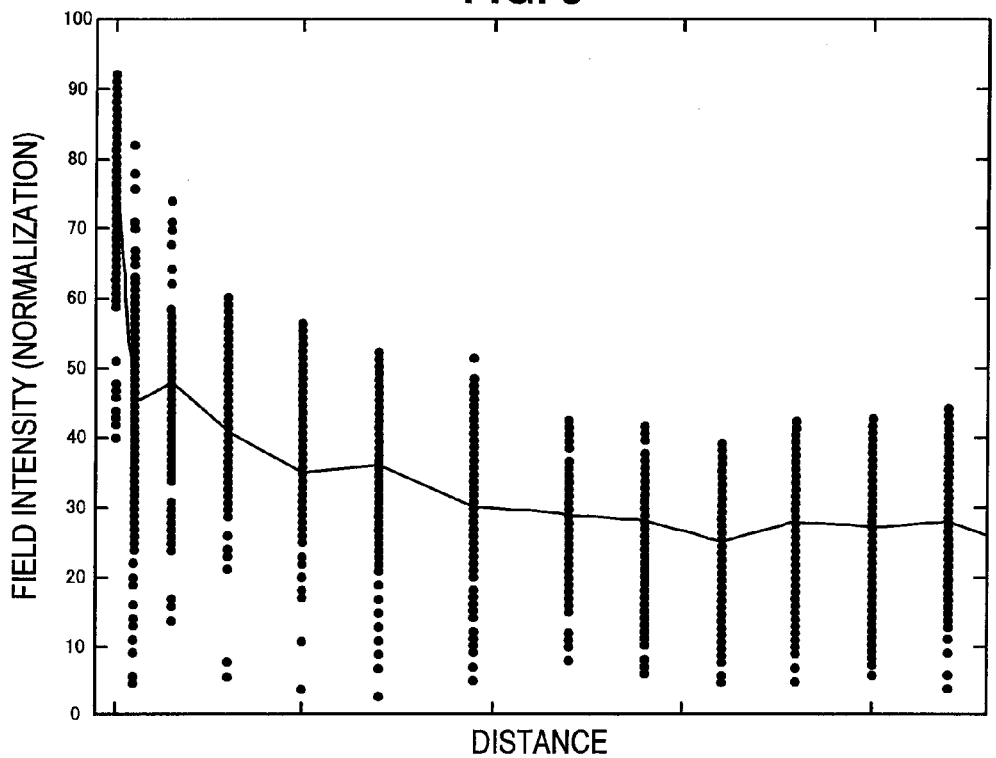
FIG. 9 is an explanatory view showing an illustrative example of the distance between a plurality of radio communication devices and a field intensity before filtering by a determination unit according to the embodiment of the present invention.

FIG. 9 is an explanatory view showing an illustrative example of distances between the radio communication devices 20 and 20' and the field intensities before filtering by the determination unit 236 according to the embodiment of the present invention. More specifically, FIG. 9 shows field intensities obtained in respective distances as changing the distance between the radio communication devices 20 and 20' to a plurality of distances. As shown in FIG. 9, before filtering by the determination unit 236, the obtained field intensity varies in a range even when the distance of the radio communication devices 20 and 20' is the same.

Figure 10:
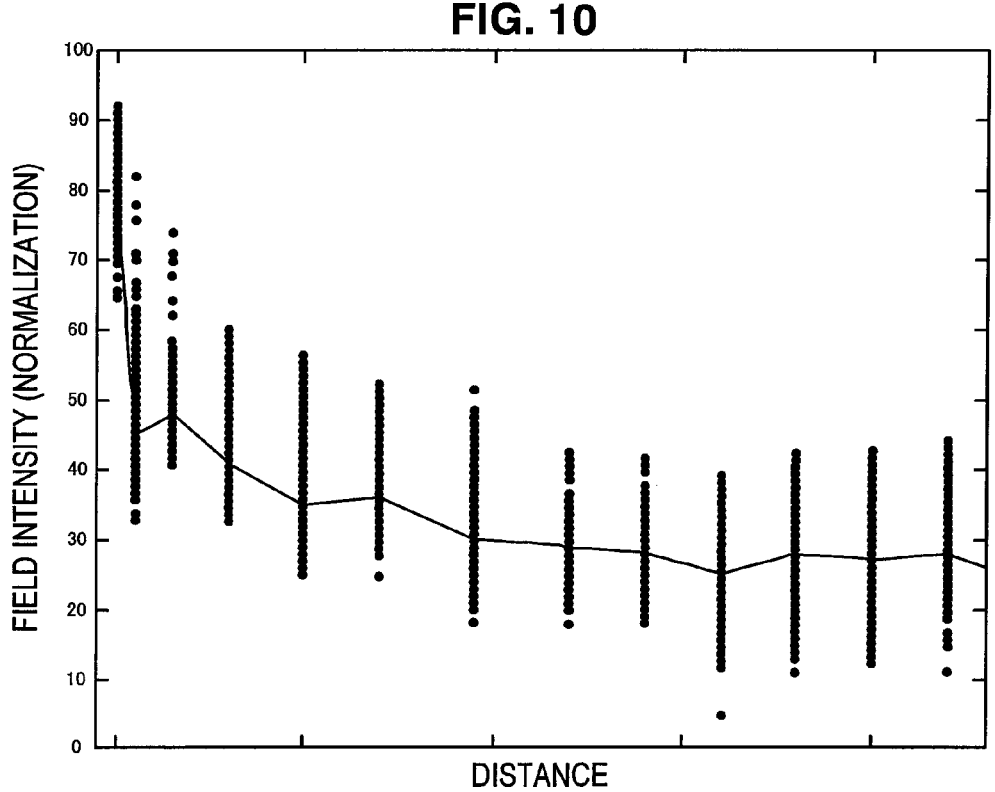
FIG. 10 is an explanatory view showing an illustrative example of the distance between a plurality of radio communication devices and the field intensity after filtering by the determination unit according to the embodiment of the present invention.

FIG. 10 is an explanatory view showing an illustrative example of distances between the radio communication devices 20 and 20' and the field intensities after filtering by the determination unit 236 according to the embodiment of the present invention. As shown in FIG. 10, after the filtering by the determination unit 236, the range in which the field intensity varies is smaller while the distance between the radio communication devices 20 and 20' is the same compared to the case before the filtering by the determination unit 236.

As described above, when the field intensity used by the estimation unit 232 is filtered by the determination unit 236 based on the noise floor value, the estimation unit 232 can estimate distance between the radio communication devices 20 and 20' based on reliable field intensities. As a result, the accuracy of distance estimation by the estimation unit 232 will be improved. Hereinafter, an illustrative example of the distance estimation by the estimation unit 232 will be described with reference to FIG. 11.

Figure 11:
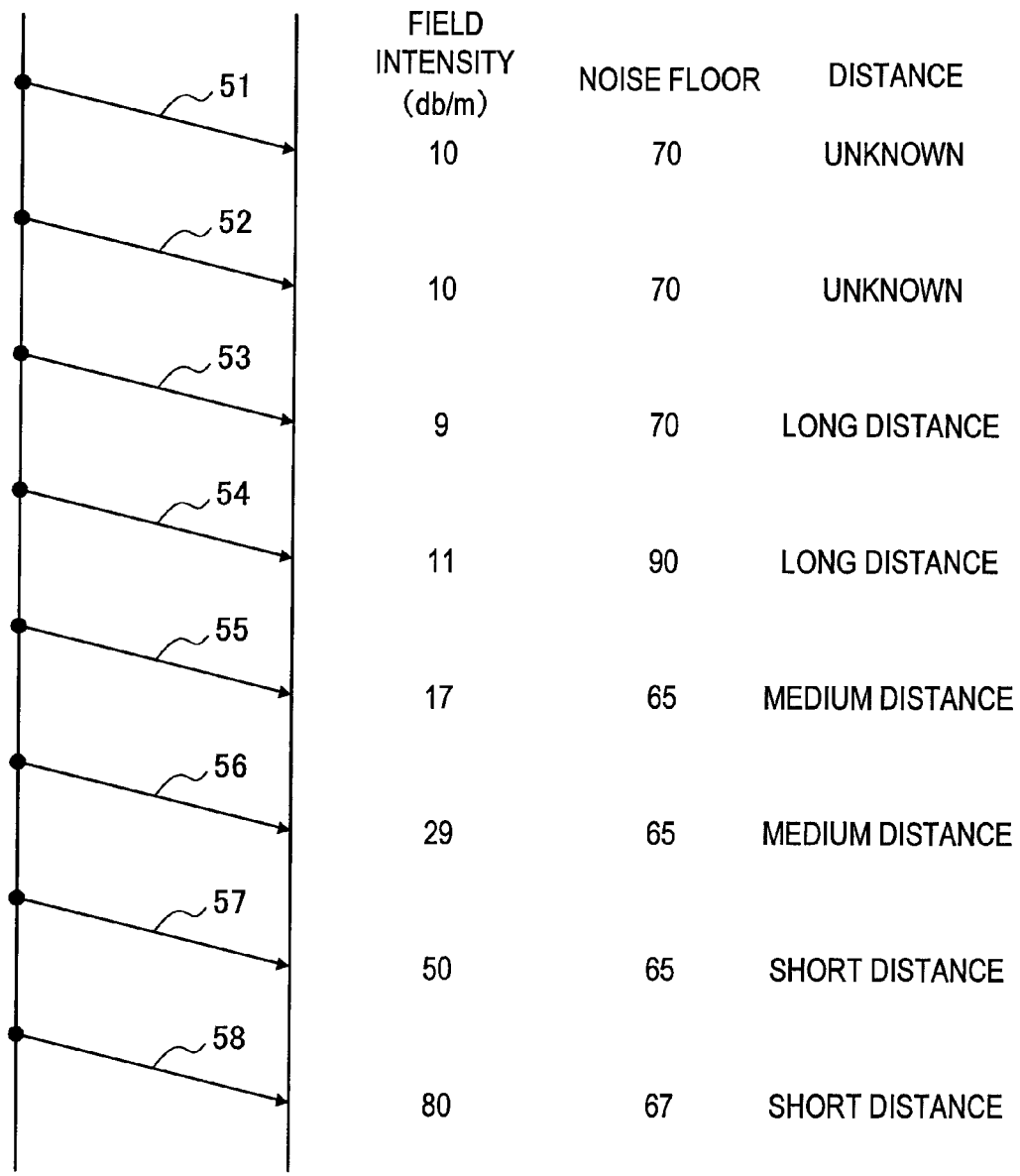
FIG. 11 is an explanatory view showing an illustrative example of the distance estimation by an estimation unit according to the embodiment of the present invention.

FIG. 11 is an explanatory view showing an illustrative example of a distance estimation by the estimation unit 232 according to the embodiment of the present invention. Here, it is assumed that, in the condition A, three or more pairs of the field intensity and noise floor value are stored as the distance measurement database, and the lower limit set value is 50 and the upper limit set value is 70, which are used for filtering by the determination unit 236. The estimation unit 232 calculates a distance measurement evaluation value by averaging the last three field intensities and sets as threshold value F=10 and threshold value N=30.

As described in FIG. 11, firstly, the radio communication device 20 receives the distance measurement packet 51. Then, the radio communication device 20 measures a field intensity of the distance measurement packet 51 as 10 db/m and a noise floor as 70. Since the noise floor of the distance measurement packet 51 satisfies the predetermined condition of the determination unit 236, the pair of the field intensity and noise floor of the distance measurement packet 51 is maintained as a distance measurement database in the estimation unit 232. However, the number of the pairs of the field intensity and noise floor maintained as the distance measurement database in the estimation unit 232 has not reached three, so the estimation unit 232 concludes that the condition A is not satisfied and the distance from the radio communication device 20' is unknown.

Next, the radio communication device 20 receives a distance measurement packet 52. Then, the radio communication device 20 measures the field intensity of the distance measurement packet 52 as 10 db/m and the noise floor as 70. Since the noise floor of the distance measurement packet 52 satisfies the predetermined condition of the determination unit 236, the pair of the field intensity and noise floor of the distance measurement packet 52 is stored as the distance measurement database in the estimation unit 232. However, the number of the pairs of the field intensity and noise floor maintained as the distance measurement database of the estimation unit 232 has not reached three, so the estimation unit 232 concludes that the condition A is not satisfied and the distance from the radio communication device 20' is unknown.

After that, the radio communication device 20 receives a distance measurement packet 53. Then, the radio communication device 20 measures the field intensity of the distance measurement packet 53 as 9 db/m and the noise floor as 70. Since the noise floor of the distance measurement packet 53 satisfies the predetermined condition of the determination unit 236, the pair of the field intensity and noise floor of the distance measurement packet 53 is maintained as the distance measurement database in the estimation unit 232. Further, the number of pairs of the field intensity and noise floor maintained as the distance measurement database of the estimation unit 232 has reached three, so the estimation unit 232 calculates the distance measurement evaluation value as $(10+10+9)/3=9.666\ldots$. Since this distance measurement evaluation value is smaller than the threshold value F, the estimation unit 232 estimates that the distance from the radio communication device 20' is a long distance.

Further, the radio communication device 20 receives a distance measurement packet 54. Then, the radio communication device 20 measures the field intensity of the distance measurement packet 54 as 11 db/m and the noise floor as 90. The noise floor of the distance measurement packet 54 does not satisfy the predetermined condition (the upper limit set value is greater than 70) of the determination unit 236, the pair of the field intensity and noise floor of the distance measurement packet 54 is not used by the estimation unit 232. However, the number of pairs of the field intensity and noise floor maintained as the distance measurement database in the estimation unit 232 has reached three, so the estimation unit 232 calculates the distance measurement evaluation value as $(10+10+9)/3=9.666\ldots$. Since this distance measurement evaluation value is smaller than the threshold value F, the estimation unit 232 estimates the distance from the radio communication device 20' is a long distance.

Next, the radio communication device 20 receives a distance measurement packet 55. Then, the radio communication device 20 measures the field intensity of the distance measurement packet 55 as 17 db/m and the noise floor as 65. Since the noise floor of the distance measurement packet 55 satisfies the predetermined condition of the determination unit 236, the pair of the field intensity and noise floor of the distance measurement packet 55 is maintained as the distance measurement database in the estimation unit 232. Further, the number of pairs of the field intensity and noise floor maintained as the distance measurement database of the estimation unit 232 has reached three, so the estimation unit 232 calculates the distance measurement evaluation value as $(10+9+17)/3=12$. Since this distance measurement evaluation value is greater than the threshold value F and smaller than the threshold value N, the estimation unit 232 estimates that the distance from the radio communication device 20' is a medium distance.

When distance measurement packets 56 to 58 are received, the estimation unit 232 operates in the same manner and estimates that the distance from the radio communication device 20' approaches to a short distance, as described below in detail. The distance from the radio communication device 20' estimated by the estimation unit 232 may be displayed on the display unit 240. Further, the distance from the radio communication device 20' estimated by the estimation unit 232 may be used in a selected application.

Here, back to the explanation of the configuration related to the distance estimation in the radio communication device 20 with reference to FIG. 3, the communication control unit 244 has a function as a control unit for controlling a distance measurement packet transmission by the communication unit 216. Hereinafter, the purpose of the provision of the communication control unit 244 and detail functions thereof will be described.

As described with reference to FIG. 11, the radio communication device 20 can estimate the distance from the radio communication device 20' by receiving a distance measurement packet from the radio communication device 20'. Further, as a manner that the radio communication device 20' estimates the distance from the radio communication device 20, a manner that a distance measurement packet is sent from the radio communication device 20 can be considered.

However, if the radio communication device 20 simply transmits a distance measurement packet every predetermined period even when the radio communication device 20' has not been in a radio wave coverage, the communication resource is used unnecessarily.

Here, when the radio communication device 20 has received a distance measurement packet from the radio communication device 20', it is likely that the radio communication device 20' is in the radio wave coverage of the radio communication device 20. On the other hand, when the radio communication device 20 cannot receive a distance measurement packet from the radio communication device 20', it is likely that the radio communication device 20' is out of the radio wave coverage of the radio communication device 20 or the packet may be lost due to a deteriorated radio wave condition.

Then, for example, the radio communication device 20' is considered as a client, the radio communication device 20 is considered as a server, and the communication control unit 244 is assumed to control to transmit a distance measurement packet to the communication unit 216 when a distance measurement packet from the radio communication device 20' is received. Here, it is assumed that the radio communication device 20' transmits a distance measurement packet every predetermined period (a period of 100 ms, for example).

With the above described configuration, since the communication control unit 244 controls the communication unit 216 to transmit a radio signal in response to a reception of a distance measurement packet, transmission of distance measurement packets which will not reach the radio communication device 20' can be prevented so that the usage of the communication resource amount can be reduced. An illustrative example of radio communication controlled by such communication control unit 244 is shown in FIG. 12.

Figure 12:
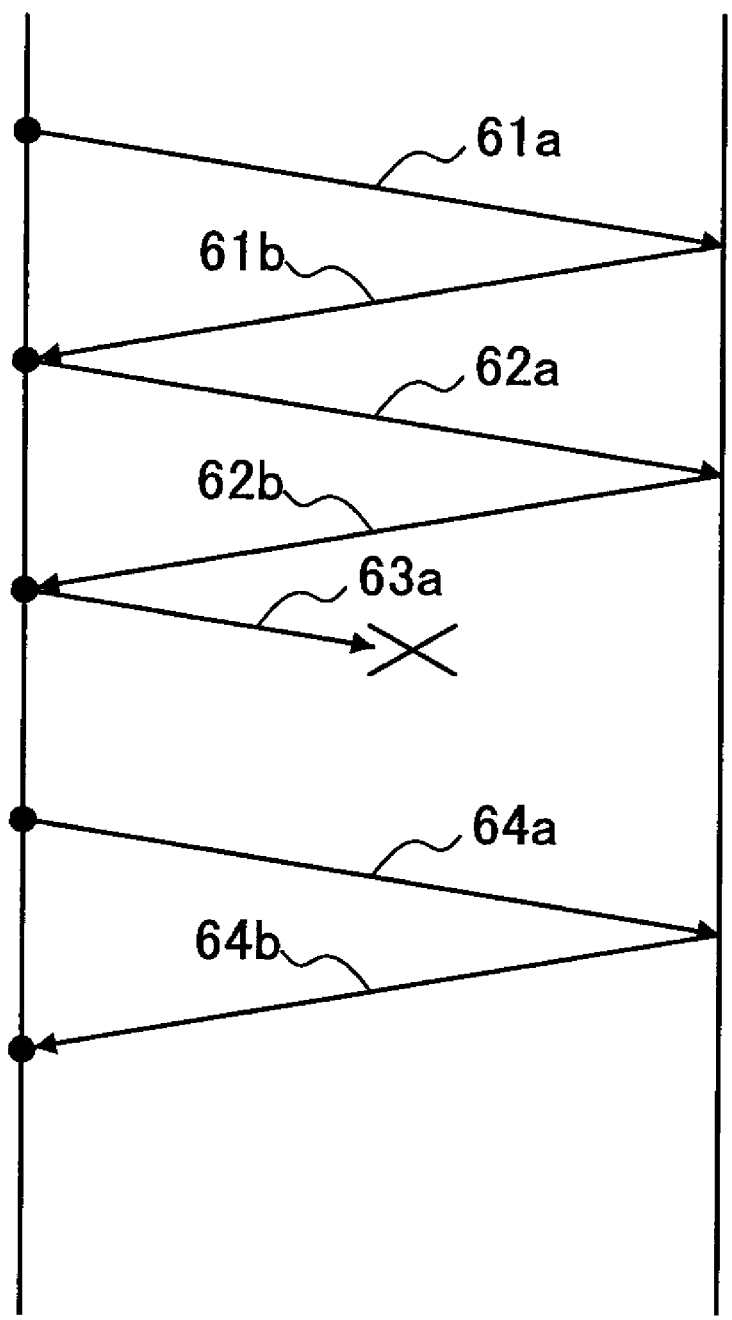
FIG. 12 is an explanatory view showing an illustrative example of radio communication controlled by a communication control unit according to the embodiment of the present invention.

FIG. 12 is an explanatory view showing the illustrative example of the radio communication controlled by the communication control unit 244 according to the embodiment of the present invention. As shown in FIG. 12, the radio communication device 20' periodically transmits distance measurement packets 61a, 62a, 63a and 64a. The radio communication device 20 transmits a distance measurement packet 61b in response to a reception of the distance measurement packet 61a. Further, the radio communication device 20 transmits a distance measurement packet 62b in response to a reception of the distance measurement packet 62a.

On the other hand, since the distance measurement packet 63a transmitted from the radio communication device 20' does not reach the radio communication device 20, the radio communication device 20 does not transmit a distance measurement packet to respond the distance measurement packet 63a. After that, the radio communication device 20 transmits a distance measurement packet 64b in response to a reception of the distance measurement packet 64a. Here, the radio communication device 20 may perform transmitting the distance measurement packet and recoding the field intensity and noise floor of the received distance measurement packet to the memory unit 228, in advance or in parallel. Further, the communication control unit 244 may have a function for generating a distance measurement packet.

Here, since the radio communication device 20' can have substantially the same function as that of the radio communication device 20, explanation of detail functions of the radio communication device 20' is omitted.

[1-B-3] Operation Related to Distance Estimation of Radio Communication Device

Functions related to the distance estimation in the radio communication device 20 according to the embodiment of the present invention have been described with reference to FIGS. 2 to 12. Next, a radio communication mode related to the distance estimation, which is executed between the radio communication device 20 and the radio communication device 20', will be described with reference to FIGS. 13 to 15.

Figure 13:
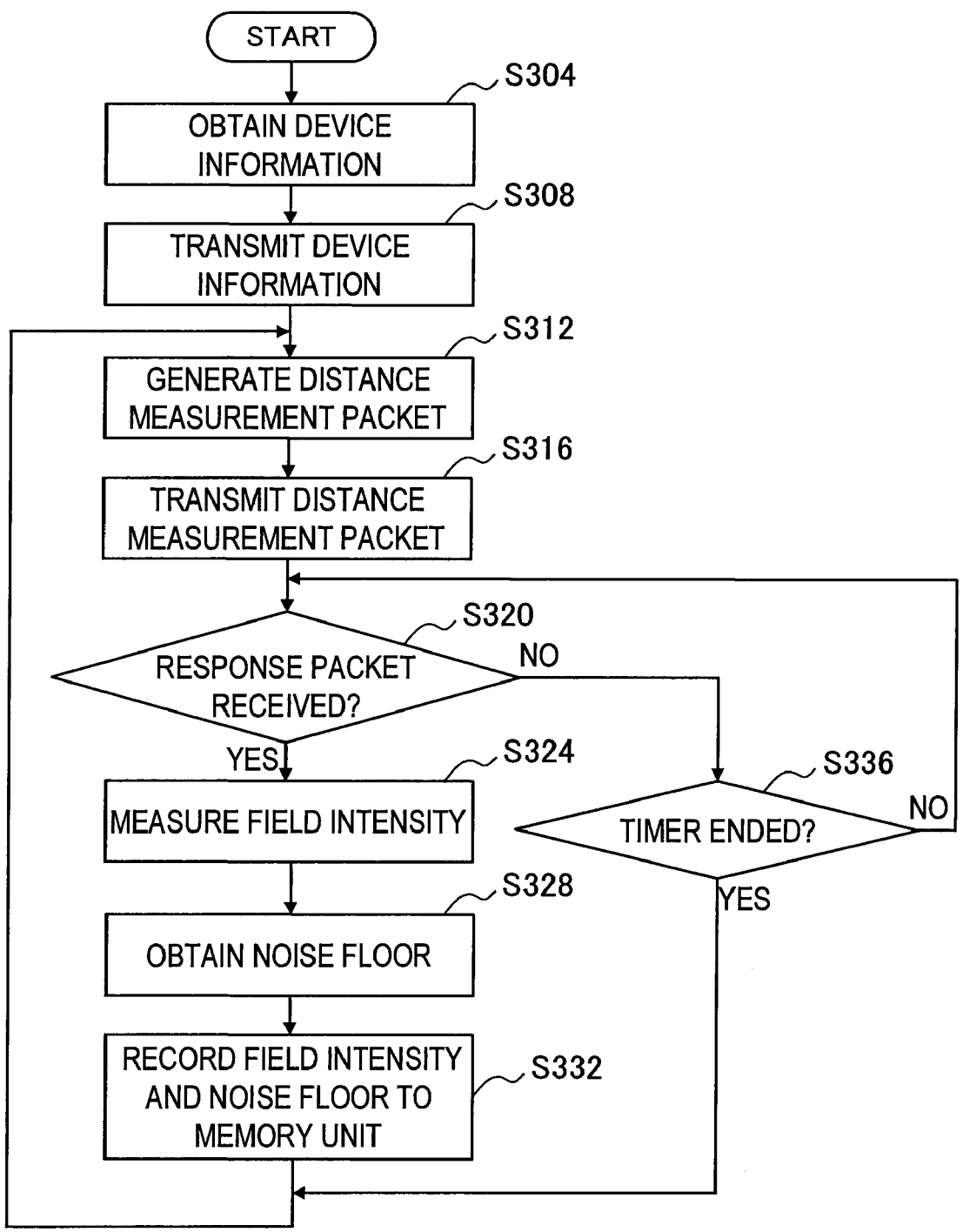
FIG. 13 is a flowchart showing a flow of an operation related to the distance estimation in a radio communication device on transmitting side according to the embodiment of the present invention.

FIG. 13 is a flowchart showing an operation flow of the radio communication device 20' on the transmitting side according to the embodiment of the present invention. As shown in FIG. 13, firstly, the radio communication device 20' obtains device information thereof (S304) and transmits the device information to the radio communication device 20 on the receiving side (S308).

After that, the radio communication device 20' generates a distance measurement packet (S312) and transmits the distance measurement packet to the radio communication device 20 on the receiving side (S316). Then, when the radio communication device 20' receives a distance measurement packet from the radio communication device 20 as a response to the transmitted distance measurement packet (S320), the radio communication device 20' measures a field intensity of the received distance measurement packet (S324). Further, the radio communication device 20' obtains a noise floor of the received distance measurement packet (S328). Then, the radio communication device 20' records the field intensity and noise floor to a memory unit (corresponding to the memory unit 228 in FIG. 3) (S332).

Further, when the distance measurement packet is transmitted to the radio communication device 20 on the receiving side (S316) but a distance measurement packet is not received as a response from the radio communication device 20 (S320), the radio communication device 20' determines whether a timer has ended (S336). When the time has ended, the radio communication device 20' repeats the process from S312 and, when the time has not ended, the radio communication device 20' repeats the process from S320.

Figure 14:
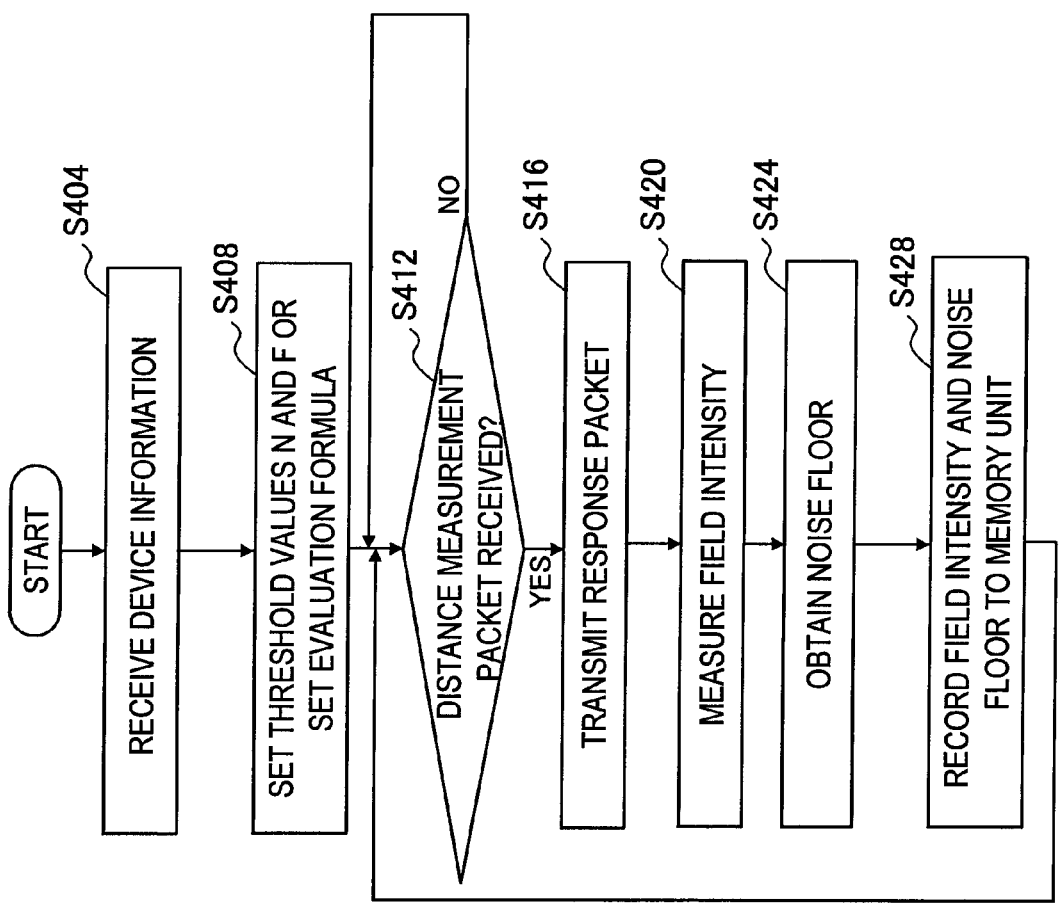
FIG. 14 is a flowchart showing a flow of an operation related to the distance estimation in a radio communication device on receiving side according to the embodiment of the present invention.
Figure 15:
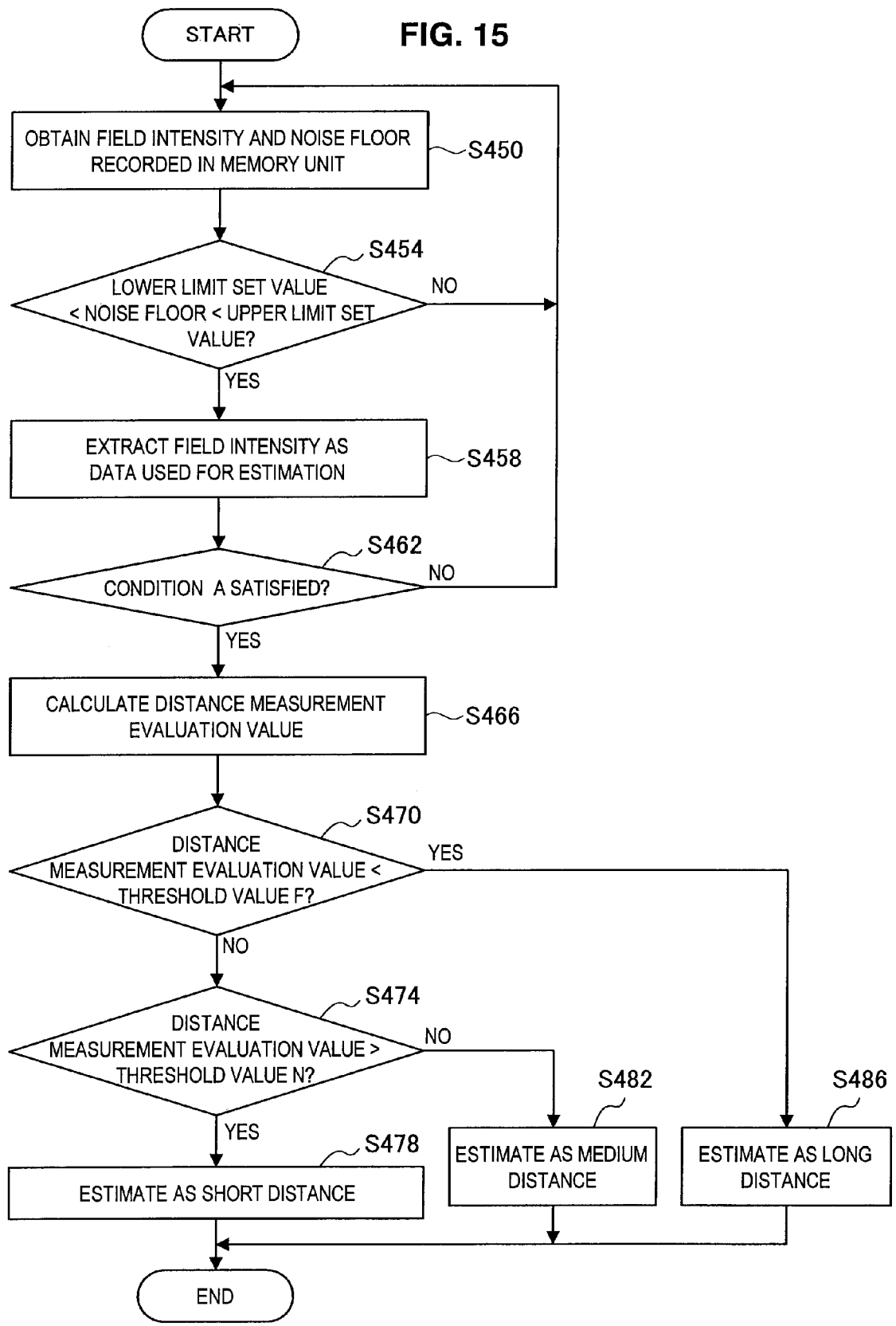
FIG. 15 is a flowchart showing a flow of an operation related to the distance estimation in a radio communication device on receiving side according to the embodiment of the present invention.

FIGS. 14 and 15 are flowcharts showing operation flows of the radio communication device 20 on the receiving side according to the embodiment of the present invention. As shown in FIG. 14, firstly, the radio communication device 20 receives device information of the radio communication device 20' from the radio communication device 20' (S404). Then, the estimation unit 232 sets threshold values N and F or an evaluation formula to threshold values N and F or an evaluation formula associated with the received device information and stored in the memory unit 228 (S408).

Then, when a distance measurement packet is received from the radio communication device 20' (S412), in the radio communication device 20, the communication control unit 244 controls the communication unit 216 to transmit a distance measurement packet as a response packet (S416). Further, the field intensity measurement unit 220 measures a field intensity of the received distance measurement packet (S420) and the noise floor measurement unit 224 obtains a noise floor of the received distance measurement packet (S424). Then, the field intensity and noise floor are recorded in the memory unit 228 (S428).

After that, as shown in FIG. 15, the estimation unit 232 obtains the pairs of the field intensity and noise floor stored in the memory unit 228 (S450). Next, the determination unit 236 determines whether the noise floor value included in the respective pairs of the field intensity and noise floor is greater than the lower limit set value and smaller than the upper limit set value (S454). Then, the determination unit 236 extracts a field intensity of the pair of the noise floor, which is determines to be smaller than the upper limit set value, as data to be used by the estimation unit 232, and controls the estimation unit 232 to maintain the data as distance measurement database (S458).

Further, the estimation unit 232 determines whether the above condition A is satisfied and, when the condition A is satisfied, calculates a distance measurement evaluation value according to the distance measurement database and a previously set evaluation formula (S466). Then, when the distance measurement evaluation value is smaller than the threshold value F (S470), the estimation unit 232 estimates that the distance relation with the radio communication device 20' is a long distance (S486).

On the other hand, when the distance measurement evaluation value is greater than the threshold value F (S470) and smaller than the threshold value N (S474), the estimation unit 232 estimates that the distance relationship with the radio communication device 20' is a medium distance (S482). Further, when the distance measurement evaluation value is greater than the threshold value F (S470) and greater than threshold value N (S474), the estimation unit 232 estimates that the distance relationship with the radio communication device 20' is a short distance (S478).

[1-C] Conclusion of Distance Estimation

As described above, in the present embodiment, the determination unit 236 determines whether the set of the field intensity and noise floor value stored in the memory unit 228 satisfies the predetermined condition. Here, when the noise floor value is greater than an upper limit set value, it is assumed that the reception environment for receiving a distance measurement packet by the communication unit 216 is remarkably deteriorated. Further, when the noise floor value is lower than a lower limit set value, it is assumed that the reception environment for receiving the distance measurement packet by the communication unit 216 is excessively good. Thus, when the noise floor value is greater than the lower limit set value and lower than the upper limit set value, it is assumed that the reception environment for receiving the distance measurement packet by the communication unit 216 is almost in a steady state.

Then, as described above, when the noise floor value is greater than the lower limit set value and lower than the upper limit set value and the determination unit 236 determines that the predetermined condition is satisfied, the estimation unit 232 can estimate the distance from the radio communication device 20' based on the field intensity that is likely to be in a steady state. As a result, the radio communication device 20 can estimate the distance from the radio communication device 20' in real time with higher accuracy.

Further, since the communication control unit 244 transmits the radio signal to the communication unit 216 in response to the reception of the distance measurement packet, it is possible to prevent a transmission of a distance measurement packet which will not reach the radio communication device 20' and suppress the usage of the communication resource amount.

[2] Radio Communication System According to Embodiment of Present Invention

The distance estimation manner in the radio communication system and the functions related to the distance estimation of the radio communication device 20 have been described with reference to FIGS. 2 to 15. The radio communication device according to the embodiment of the present invention can estimate the distance between the radio communication devices in real time with higher accuracy by the above-described distance estimation manner. Next, the radio communication system according to the embodiment of the present invention capable of obtaining audio data from other radio communication device according to the distance between the radio communication devices and reproducing the obtained audio data by a reproducing manner based on the distance between the radio communication devices will be described.

Further, in the following description, audio data represents data recorded in an audio format such as MP3 (Moving Picture experts group phase-1 audio layer-3) or ATRAC (Adaptive TRansform Acoustic Coding), for example. Note that it is obvious that the audio data according to the embodiment of the present invention is not limited to the above data.

[2-A] Outline of Audio Data Reproducing Method in Radio Communication System

Figure 16:
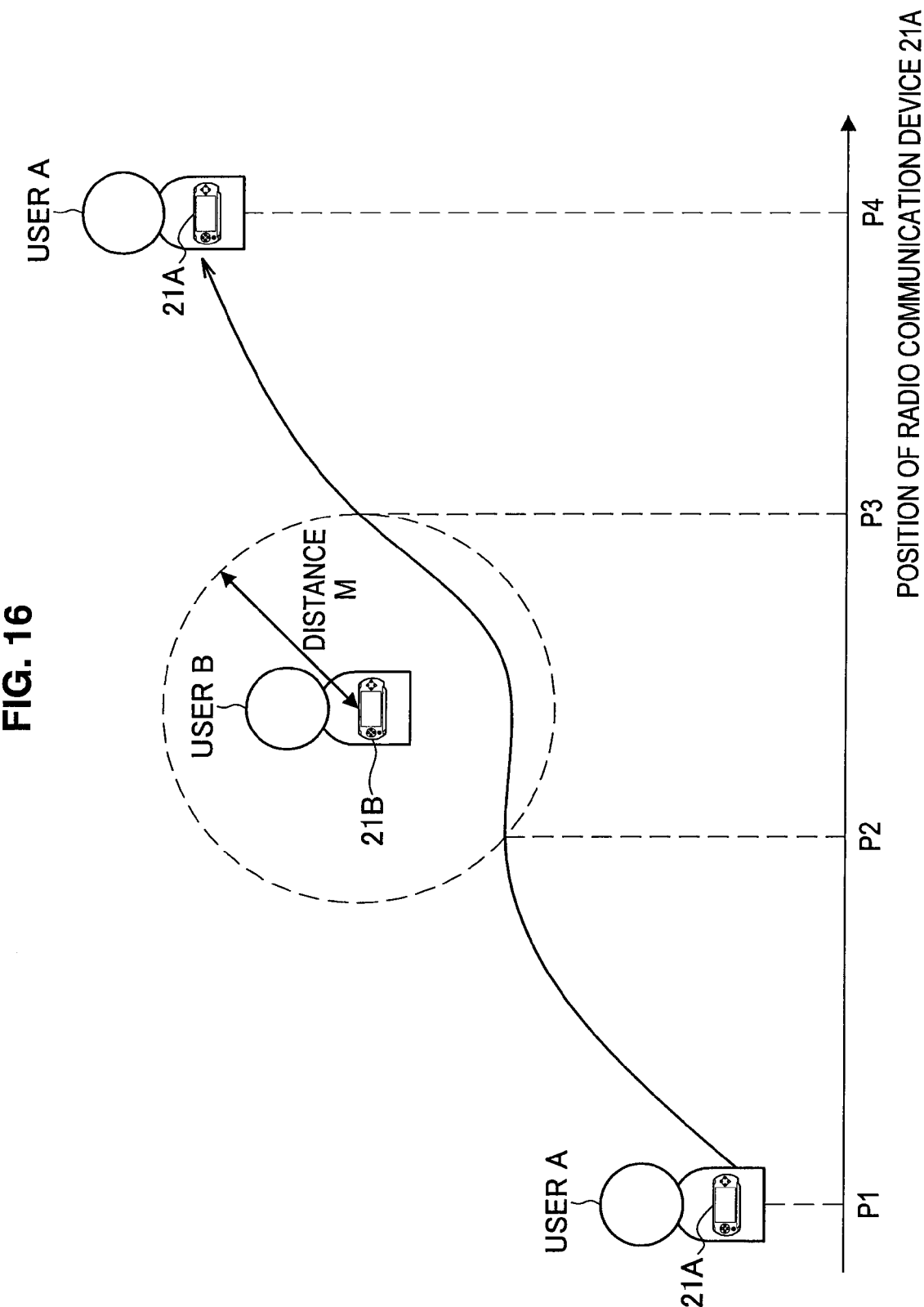
FIG. 16 is a first explanatory view for explaining an outline of an audio data reproducing method in the radio communication system according to the embodiment of the present invention.

FIG. 16 is a first explanatory view for explaining the outline of the audio data reproducing method in the radio communication system according to the embodiment of the present invention. FIG. 16 shows a condition where a user A having a radio communication device 21A moves from position P1 to position P4 while reproducing audio data X (first audio data) stored in the radio communication device 21A. Further, FIG. 16 shows an example in which the user A moves from position P2 to position P3 within a distance M from a radio communication device 21B that stores audio data Y (second audio data). Note that, in FIG. 16, for the sake of simplification of description, positions are shown on one axis in a horizontal direction.

Figure 17:
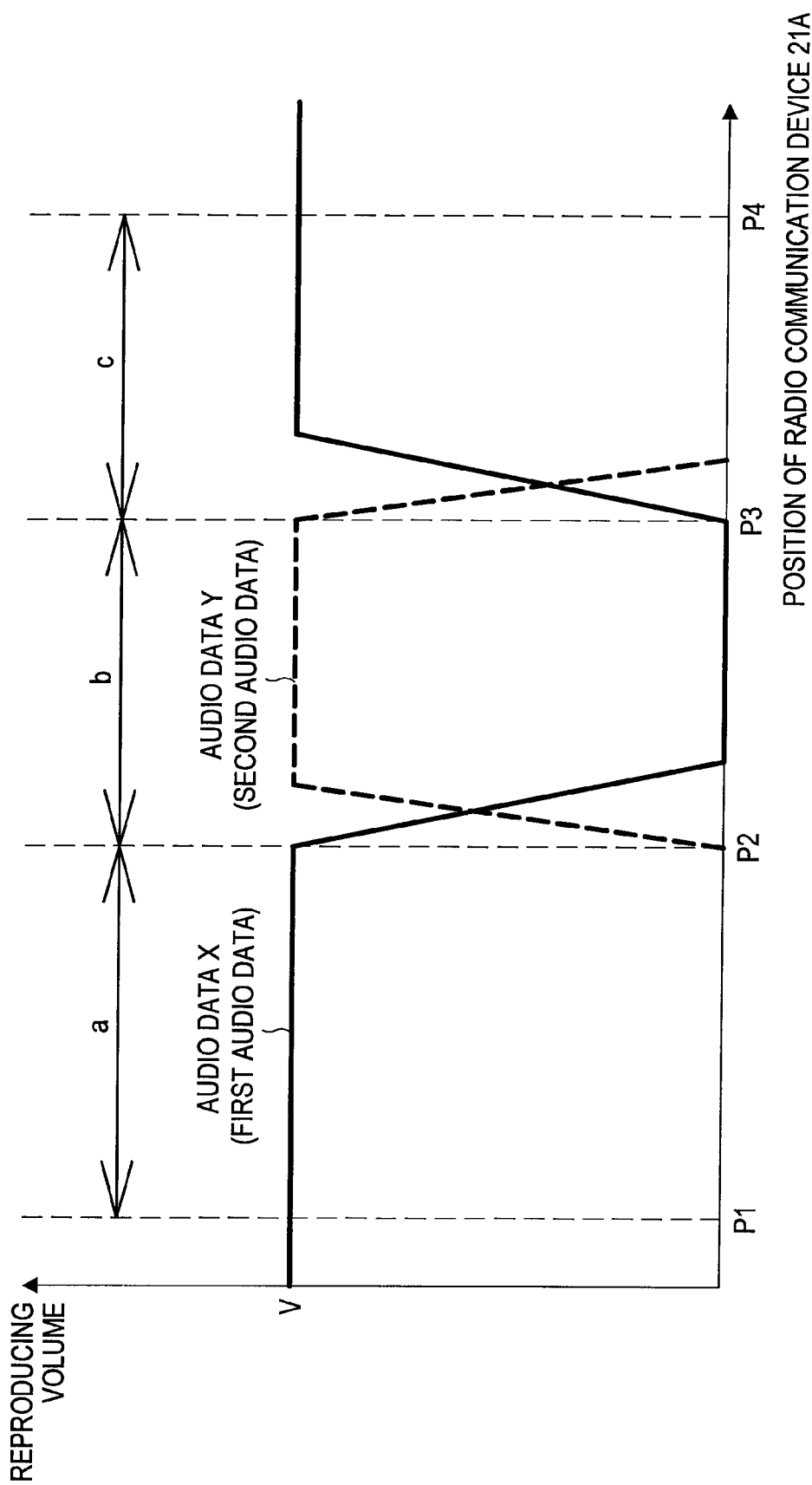
FIG. 17 is a second explanatory view showing an outline of an audio data reproducing method in the radio communication system according to the embodiment of the present invention.

Here, an example of the audio data reproducing method in the condition shown in FIG. 16 will be described using an example of an audio data reproduction in the radio communication device 21A. FIG. 17 is a second explanatory view for explaining an outline of the audio data reproducing method in the radio communication system according to the embodiment of the present invention. Here, FIG. 17 shows a relationship between the positions of the radio communication device 21A and reproducing volumes of audio data reproduced in the radio communication device 21A.

<1> First Case (Zone a in FIG. 17)

The radio communication device 21A estimates the distance from the radio communication device 21 (hereinafter, the distance estimated by the radio communication device 21A is referred to as an "estimated distance"). When the estimated distance between the radio communication device 21A and the radio communication device 21B is greater than the distance M, the radio communication device 21A reproduces the audio data X (first audio data) stored in the own device at a reproducing volume V.

<2> Second Case (Zone b in FIG. 17)

When the estimated distance between the radio communication device 21A and the radio communication device 21B becomes shorter than the distance M, the radio communication device 21A obtains the audio data Y (second audio data) from the radio communication device 21B and starts to reproduce the obtained audio data Y (second audio data). In this case, the radio communication device 21A adjusts the reproducing volume of the audio data Y (second audio data) to gradually turn up in a predetermined period of time. Hereinafter, to adjust a reproducing volume of audio data to gradually turn up in a predetermined period of time is referred to as "fade in."

Note that the radio communication device 21A can perform a stream reproduction of the audio data Y (second audio data) obtained from the radio communication device 21B or can reproduce the data after downloading.

Further, when the estimated distance becomes shorter than the distance M, the radio communication device 21A adjusts the reproducing volume of the audio data X (first audio data), which is being reproduced, to gradually turn down in a predetermined period in synchronization with the fade-in of the audio data Y (second audio data), for example. Hereinafter, to adjust a reproducing volume of audio data to gradually turn down in a predetermined period of time is referred to as "fade out."

Thus, when the radio communication device 21A adjusts the fade-out of the audio data X (first audio data) in synchronization with the fade-in of the audio data Y (second audio data), the radio communication device 21A can make the user A feel that the reproduction of the audio data X (first audio data) and reproduction of the audio data Y (second audio data) are gradually switched.

<3> Third Case (Zone c in FIG. 17)

When the estimated distance between the radio communication device 21A and the radio communication device 21B becomes greater than the distance M again, the radio communication device 21A fades out the audio data Y (second audio data), which is being reproduced. Then, the radio communication device 21A fades in the audio data X (first audio data) in synchronization with the fade-out of the audio data Y (second audio data), for example.

Thus, when the radio communication device 21A performs the fade-out of the audio data Y (second audio data) and the fade-in of the audio data X (first audio data) in synchronization, the radio communication device 21A can make the user A feel that the reproduction of the audio data X (first audio data) and the reproduction of the audio data Y (second audio data) are gradually switched.

As shown in FIG. 17, the radio communication device 21A obtains the audio data Y (second audio data) from the radio communication device 21B according to the estimated distance from the radio communication device 21B. Then, the radio communication device 21A adjusts the reproducing volume of the audio data X (first audio data) stored in the own device and the reproducing volume of the audio data Y (second audio data) obtained from the radio communication device 21B based on the estimated distance from the radio communication device 21B. Here, the radio communication device 21A can estimate the distance between the radio communication devices in real time with higher accuracy by the above-described distance estimation manner. Thus, the radio communication device 21A can reduce the possibility that the audio data cannot be obtained from the radio communication device 21B, compared with a conventional radio communication device. Further, the radio communication device 21A can reproduce the audio data by the reproducing manner appropriate to the actual distance between the radio communication devices.

Note that the audio data reproducing method according to the embodiment of the present invention is not limited to the example shown in FIG. 17. For example, the radio communication device 21A can temporarily stop the reproduction of the faded out audio data X (first audio data) in zone b shown in FIG. 17 and restart the reproduction of the audio data X (first audio data) when the estimated distance from the radio communication device 21B becomes greater than the distance M. Further, in zone b shown in FIG. 17, the radio communication device 21A may reproduce the audio data Y (second audio data) at a reproducing volume V without fading in, for example. Further, in zone b shown in FIG. 17, the radio communication device 21A may fade in the audio data Y (second audio data) while reproducing the audio data X (first audio data) at the reproducing volume V.

[2-B] Radio Communication Device Constituting Radio Communication System

Next, the audio data reproducing method in the radio communication device constituting the radio communication system according to the embodiment of the present invention and functions of the radio communication device will be described. Hereinafter, the radio communication device 21A shown in FIG. 16 will be described as an example. Here, the radio communication device according to the embodiment of the present invention including the radio communication device 21B or the like shown in FIG. 16 can have the same configuration as that of the radio communication device 21A, so those descriptions will be omitted.

[2-B-1] Audio Data Reproducing Method

[1] First Reproducing Method

Figure 18:
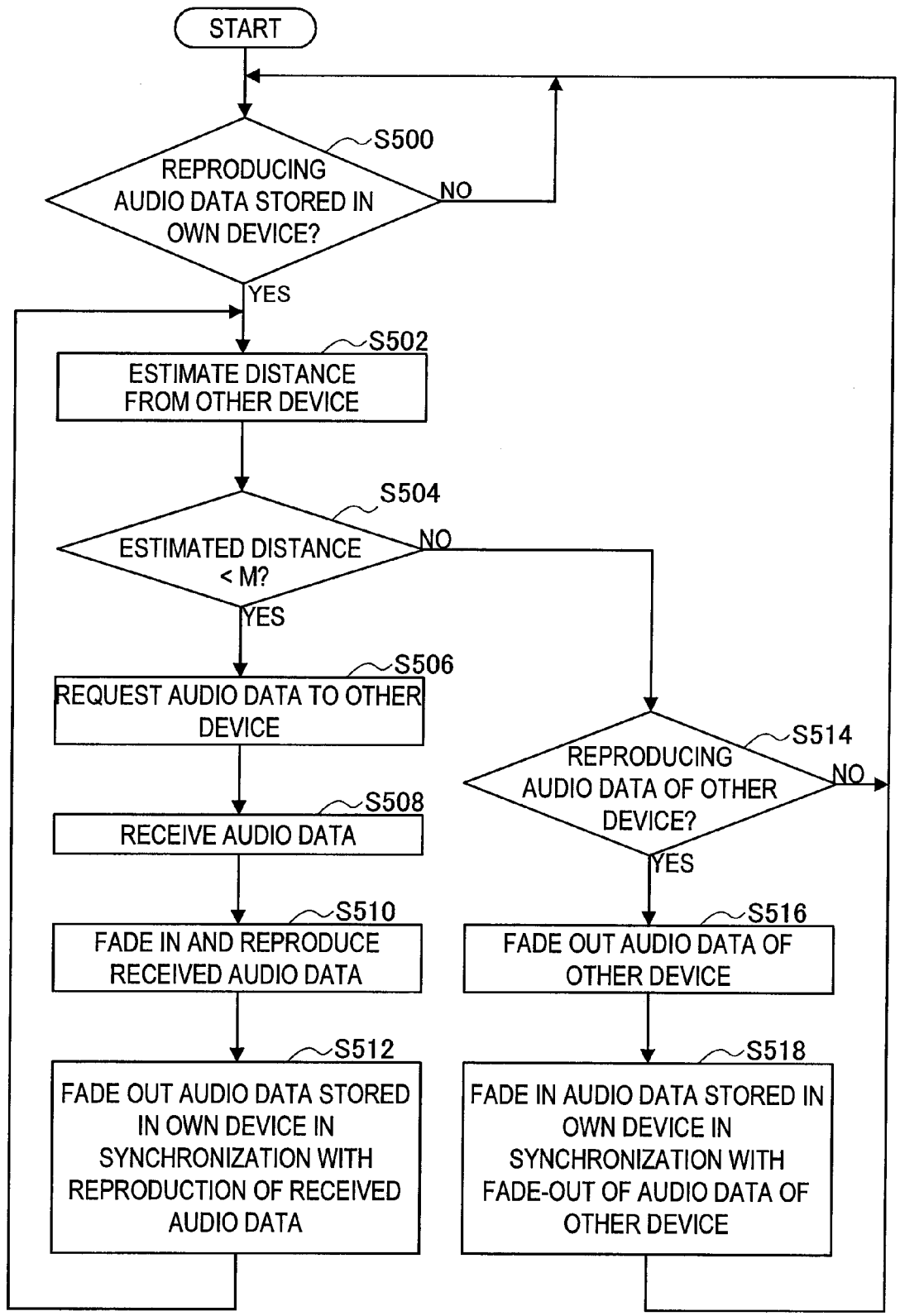
FIG. 18 is a flowchart showing an example of a first reproducing method of audio data in the radio communication device according to the embodiment of the present invention.

FIG. 18 is a flowchart showing an example of a first reproducing method of audio data in the radio communication device 21A according to the embodiment of the present invention.

The radio communication device 21A determines whether the audio data stored in the own device (hereinafter, referred to as "first audio data") is being reproduced (S500). The radio communication device 21A can perform the process in step S500 based on an operation condition of an application for reproducing audio data, for example; however it is not limited to the above.

When it is not determined that the first audio data is being reproduced in step S500, the radio communication device 21A does not proceed the process until it is determined that the first audio data is being reproduced. Here, it is obvious that the radio communication device 21A may perform the process in step S502 and the following processes regardless of the determination result in step S500.

When it is determined that the first audio data is being reproduced in step S500, the radio communication device 21A estimates the distance from other device (S502). Here, the radio communication device 21A estimates the distance between radio communication devices in real time by the distance estimation manner described in the above item [1]. Further, the radio communication device 21A can estimate distances from the plurality of radio communication devices, respectively.

When the distance is estimated in step S502, the radio communication device 21A determines whether the estimated distance satisfies a predetermined condition (S504). In step S504 shown in FIG. 18, it is assumed that the predetermined condition is "a case where the estimated distance is shorter than the predetermined distance M." Note that the predetermined distance M may be previously set in the radio communication device 21A for example; however, it is not limited to the above. For example, as shown in FIG. 16, the predetermined distance M is set in the radio communication device 21B (other device), and the radio communication device 21A can obtain the information of predetermined distance M from the radio communication device 21B.

Here, when the radio communication device 21A derives estimated distances from a plurality of radio communication devices respectively, the radio communication device 21A can perform determination for the respective estimated distances in step S504.

When it is determined that the estimated distance satisfies the predetermined condition in step S504, the radio communication device 21A transmits a request for audio data of other device according to the derived estimated distance (S506). Here, the radio communication device 21A can perform the process in step S506 by transmitting an "audio data transmission request" to other device to instruct to transmit audio data to the device from which the request is received, for example.

Here, when there are a plurality of other devices having the estimated distances that satisfy the predetermined condition in step S504, the radio communication device 21A can selectively transmit a request for audio data to one of other devices. Here, the radio communication device 21A can selectively transmit a request for audio data to other device which has the shortest estimated distance, other device that is firstly determined to satisfy the predetermined condition, or other device which is selected by the user A of the radio communication device 21A, for example; however, it is not limited to the above.

Further, although it is not shown in FIG. 18, when it is determined that the estimated distance satisfies the predetermined condition in step S504 and the audio data (second audio data) transmitted from other device is already being reproduced, the radio communication device 21A can repeat the processes from step S502 without performing the processes in steps S506 to S512.

The radio communication device 21A receives audio data (hereinafter, the audio data obtained from other device is referred to as "second audio data") from other device in response to the request in step S506 (S508), and fades in and reproduces the received audio data (S510).

Further, the radio communication device 21A fades out the first audio data in synchronization with the fade-in of the second audio data in step S510 (S512). Then, the radio communication device 21A repeats the processes from step S502.

By the processes in steps S510 and S512, the reproduction shown in zone b of FIG. 17 is realized in the radio communication device 21A. Note that FIG. 18 shows an example in which the process in step S512 is performed in synchronization after the process in step S510; however, it is not limited to the above. Since the radio communication device 21A can perform the process in step S510 and the process in step S512 in synchronization, the radio communication device 21A can perform the process in step S510 in synchronization after the process in step S512. Note that it is obvious that the radio communication device according to the embodiment of the present invention can perform the process in step S510 and the process in step S512 independently.

When it is not determined that the estimated distance satisfies the predetermined condition in step S504, the radio communication device 21A determines whether the second audio data is being reproduced (S514). When it is not determined that the second audio data is being reproduced in step S514, the radio communication device 21A repeats the processes from step S500.

Further, when it is determined that the second audio data is being reproduced in step S514, the radio communication device 21A fades out the second audio data (S516).

Further, the radio communication device 21A fades in the first audio data in synchronization with the fade-out of the second audio data in step S516 (S518). Then, the radio communication device 21A repeats the processes from step S500.

By the processes in steps S516 and S518, the reproduction as shown in zone c of FIG. 17 is realized in the radio communication device 21A. Note that it is obvious that the radio communication device according to the embodiment of the present invention can perform the process in step S516 and the process in step S518 independently.

The radio communication device 21A can realize the reproduction of audio data as shown in FIG. 17 by the first reproducing method shown in FIG. 18.

[2] Second Reproducing Method

Figure 19:
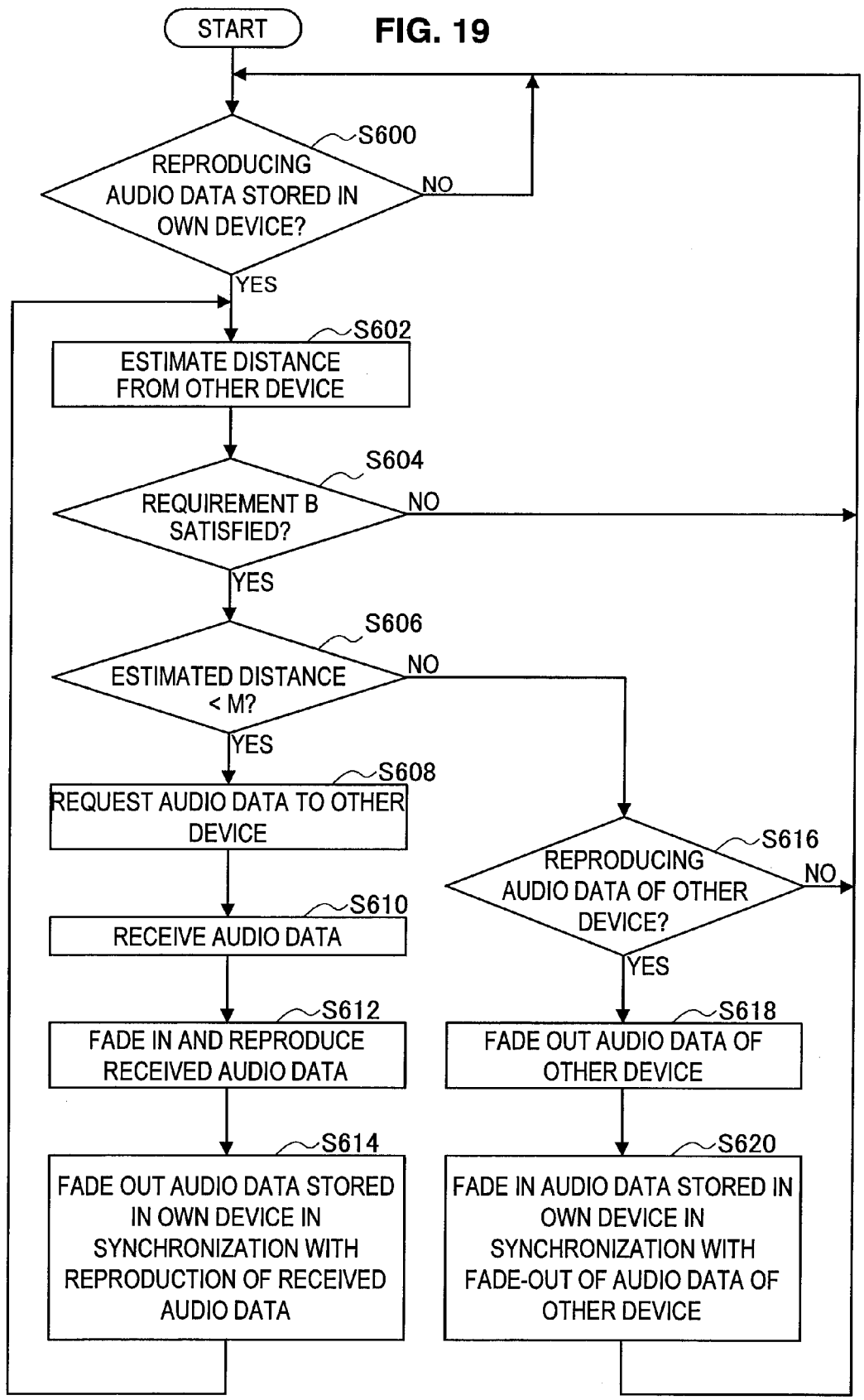
FIG. 19 is a flowchart showing an example of a second reproducing method of audio data in the radio communication device according to the embodiment of the present invention.

An example of the reproducing method according to the embodiment of the present invention has been described with reference to FIG. 18; however, the reproducing method according to the embodiment of the present invention is not limited to the method shown in FIG. 18. Next, a second reproducing method according to the embodiment of the present invention will be described. FIG. 19 is a flowchart showing an example of the second reproducing method of the audio data in the radio communication device according to the embodiment of the present invention.

Similarly to step S500 in FIG. 18, the radio communication device 21A determines whether the first audio data is being reproduced (S600). Here, when it is not determined that the first audio data is being reproduced in step S600, the radio communication device 21A does not proceed the process until it is determined that the first audio data is being reproduced.

When it is determined that the first audio data is being reproduced in step S600, the radio communication device 21A estimates a distance from the device, similarly to step S502 in FIG. 18 (S602).

Then, the radio communication device 21A determines whether other device satisfies a condition B (S604). Here, the condition B is a condition to selectively obtain audio data from other device to reproduce. The condition B may be a condition for selecting the second audio data or a condition for selecting other device for example; however it is not limited to the above. Here, the condition for selecting the second audio data is a condition to limit the second audio data to be obtained from other device. As the condition for selecting the second audio data, for example, there is meta-information such as genres and artist names; however, it is not limited to the above. Further, the condition for selecting other device is a condition to limit other device to obtain the second audio data. As the condition for selecting other device, there is device identification information such as MAC address (Media Access Control address) that allows to identify the respective other devices, for example; however, it is not limited to the above.

Further, the radio communication device 21A transmits, to other device, a request to obtain information for determining the condition B (determination condition information) such as a condition for selecting second audio data or a condition for select other device for example and obtains determination condition information from other device. By obtaining the determination condition information from other device as described above, the radio communication device 21A can perform the process in step S604 based on the determination condition information.

Note that the manner for obtaining the determination condition information in the radio communication device according to the embodiment of the present invention is not limited to the above. For example, each radio communication device according to the embodiment of the present invention may transmit, as a distance measurement packet, meta-information such as a genre or a name of artist of the first audio data stored in the own device or device identification information such as MAC address of the own device. With this configuration, each radio communication device according to the embodiment of the present invention can recognize information of stored audio data or information such as a MAC address among the radio communication devices by transmitting/receiving the distance measurement packet.

When it is not determined that other device satisfies the condition B in step S604, the radio communication device 21A repeats the processes from step S600. Here, in a case where there are a plurality of estimated distances which are derived in step S602, when other devices according to the respective estimated distances do not satisfy the condition B, the processes from step S600 are repeated, for example.

Further, similarly to step S504 in FIG. 18, when it is determined that other device satisfies the condition B in step S604, the radio communication device 21A determines whether the estimated distance satisfies a predetermined condition (S606).

Similarly to step S506 in FIG. 18, when it is determined that the estimated distance satisfies the predetermined condition in step S606, the radio communication device 21A transmits a request for audio data to other device according to the estimated distance that is derived (S608). Then, similarly to step S510 in FIG. 18, the radio communication device 21A receives the second audio data transmitted from other device in response to the request in step S608 (S610), and fades in and reproduces the received audio data (S612).

Further, similarly to step S512 in FIG. 18, the radio communication device 21A fades out the first audio data in synchronization with the fade-in of the second audio data in step S612 (S614). Then, the radio communication device 21A repeats the processes from step S602.

By the processes in step S612 and step S614, in the radio communication device 21A, the reproduction as shown in zone b of FIG. 17 is realized.

Here, although it is not shown in FIG. 19, when it is determined that the estimated distance satisfies the predetermined condition in step S606 and the second audio data is already being reproduced, the radio communication device 21A does not perform the processes from steps S608 to S614 and can repeat the processes from step S602.

When it is not determined that the estimated distance satisfies the predetermined condition in step S606, the radio communication device 21A determines whether the second audio data is being reproduced (S616). When it is not determined that the second audio data is being reproduced in step S616, the radio communication device 21A repeats the processes from step S600.

Further, when it is determined that the second audio data is being reproduced in step S616, the radio communication device 21A fades out the second audio data (S618). Similarly to step S518 in FIG. 18, the radio communication device 21A fades in the first audio data (S620) in synchronized with the fade-out of the second audio data in step S618. Then, the radio communication device 21A repeats the processes from step S600.

By the processes in steps S618 and S620, in the radio communication device 21A, the reproduction as shown in zone c of FIG. 17 is realized.

The radio communication device 21A can realize the audio data reproduction as shown in FIG. 17 by the second reproducing method shown in FIG. 19.

[3] Third Reproducing Method

Figure 20:
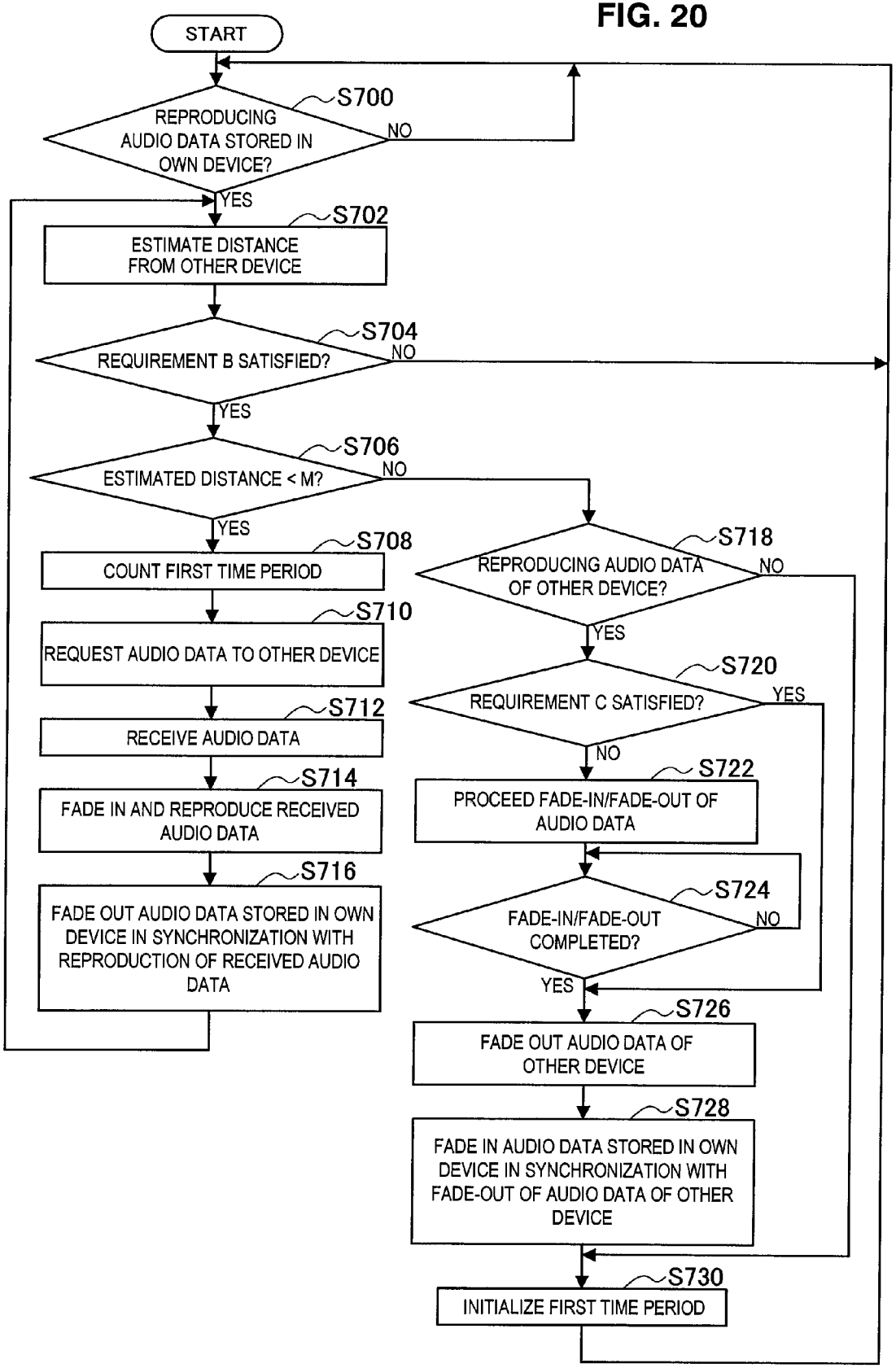
FIG. 20 is a flowchart showing an example of a third reproducing method of audio data in the radio communication device according to the embodiment of the present invention.

Next, a third reproducing method according to the embodiment of the present invention will be described. FIG. 20 is a flowchart showing an example of the third reproducing method of audio data in a radio communication device according to the embodiment of the present invention.

Similarly to step S500 of FIG. 18, the radio communication device 21A determines whether the first audio data is being reproduced (S700). Here, when it is not determined that the first audio data is being reproduced in step S700, the radio communication device 21A does not proceed the process until it is determined that the first audio data is being reproduced.

When it is determined that the first audio data is being reproduced in step S700, the radio communication device 21A estimates the distance from other device (S702), similarly to step S502 in FIG. 18. Then, similarly to step S604 in FIG. 19, the radio communication device 21A determines whether other device satisfies the condition B (S704). When it is not determined that other device satisfies the condition B in step S704, the radio communication device 21A repeats the processes from step S700.

Further, when it is determined that other device satisfies the condition B in step S704, the radio communication device 21A determines whether the estimated distance satisfies the predetermined condition (S706), similarly to step S504 in FIG. 18.

When it is determined that the estimated distance satisfies the predetermined condition in step S706, the radio communication device 21A counts the first time period (S708). Note that the first time period is a period of time that indicates a condition in which the estimated distance satisfies the predetermined condition, that is, a condition in which the estimated distance is shorter than the predetermined distance M (smaller than a predetermined threshold value). The reason why the first time period is counted in the third reproducing method will be described later.

When counting of the first time period starts in step S708, the radio communication device 21A transmits a request for audio data to other device according to the estimated distance that is derived (S710), similarly to step S506 in FIG. 18. Then, the radio communication device 21A receives the second audio data transmitted from other device in response to the request in step S710 (S712), and fades in and reproduces the received audio data, similarly to step S510 in FIG. 18 (S714).

Further, similarly to step S512 in FIG. 18, the radio communication device 21A fades out the first audio data (S716) in synchronization with the fade-in of the second audio data in step S714. Then, the radio communication device 21A repeats the processes from step S702.

By the processes in steps S714 and S716, in the radio communication device 21A, the reproduction as shown in zone b of FIG. 17 is realized.

Although it is not shown in FIG. 20, when it is determined that the estimated distance satisfies the predetermined condition in step S706 and the second audio data is already being reproduced, the radio communication device 21A can repeat the processes from step S702 without performing the processes in steps S708 to S716.

When it is not determined that the estimated distance satisfies the predetermined condition in step S706, the radio communication device 21A determines whether the second audio data is being reproduced (S718). When it is not determined that the second audio data is being reproduced in step S718, the radio communication device 21A initializes the count value of the first time period that is counted in step S708 (S730) and repeats the processes from step S700.

Further, when it is determined that the second audio data is being reproduced in step S718, the radio communication device 21A determines whether a condition C is satisfied (S720). Here, the condition C is a condition to determine a completion of fade-in or fade-out of audio data in the radio communication device 21A. Hereinafter, the reason why the condition C is used for the determination in the third reproducing method will be described.

<Reason of Determination Regarding Condition C>

Figure 21:
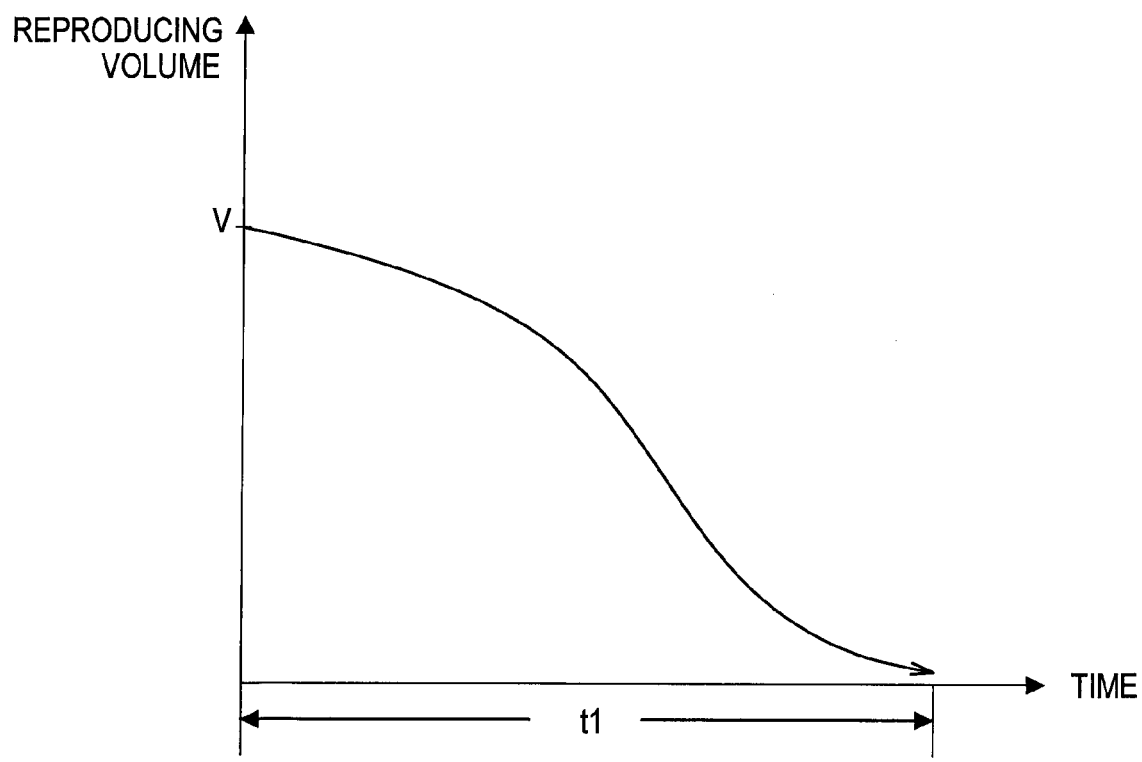
FIG. 21 is a first explanatory view for explaining a reason why the radio communication device performs a determination related to a condition C in the third reproducing method of audio data according to the embodiment of the present invention.

FIG. 21 is a first explanatory view for explaining a reason why the radio communication device 21A makes a determination regarding the condition C in the third reproducing method of the audio data according to the embodiment of the present invention audio data. Here, FIG. 21 shows a fade-out of audio data in the radio communication device 21A with a reproducing volume axis and a time axis.

Referring to FIG. 21, the radio communication device 21A takes a predetermined time period t1 to fade out the audio data (hereinafter, the time period taken for the fade-out is referred to as a "second time period"). Here, the distance between the radio communication device 21A and other device is not always constant but the radio communication device 21A can estimate the distance at real time. In other words, when the fade-out of the first audio data is performed in step S716, the radio communication device 21A may determine that the estimated distance becomes out of the predetermined condition before the second time period t1 ends.

In this case, in the radio communication device 21A which is used for the above-described first reproducing method and second reproducing method, the first audio data, which is being fade out, is to be fade in during the fade-out. When the first audio data is reproduced as described above, it is difficult to deny the possibility that the user A of the radio communication device 21A feels uncomfortable.

Thus, in the third reproducing method, by using the first time period and second time period t1 which are started to be counted in step S708, "first time period>second time period t1" may be one condition of the condition C, for example. Since the one condition of the condition C is set as "first time period>second time period t1," the radio communication device 21A determines the completion of the fade-out of the first audio data in step S716 and can prevent flutter in changes of the reproducing volume of the first audio data.

Figure 22:
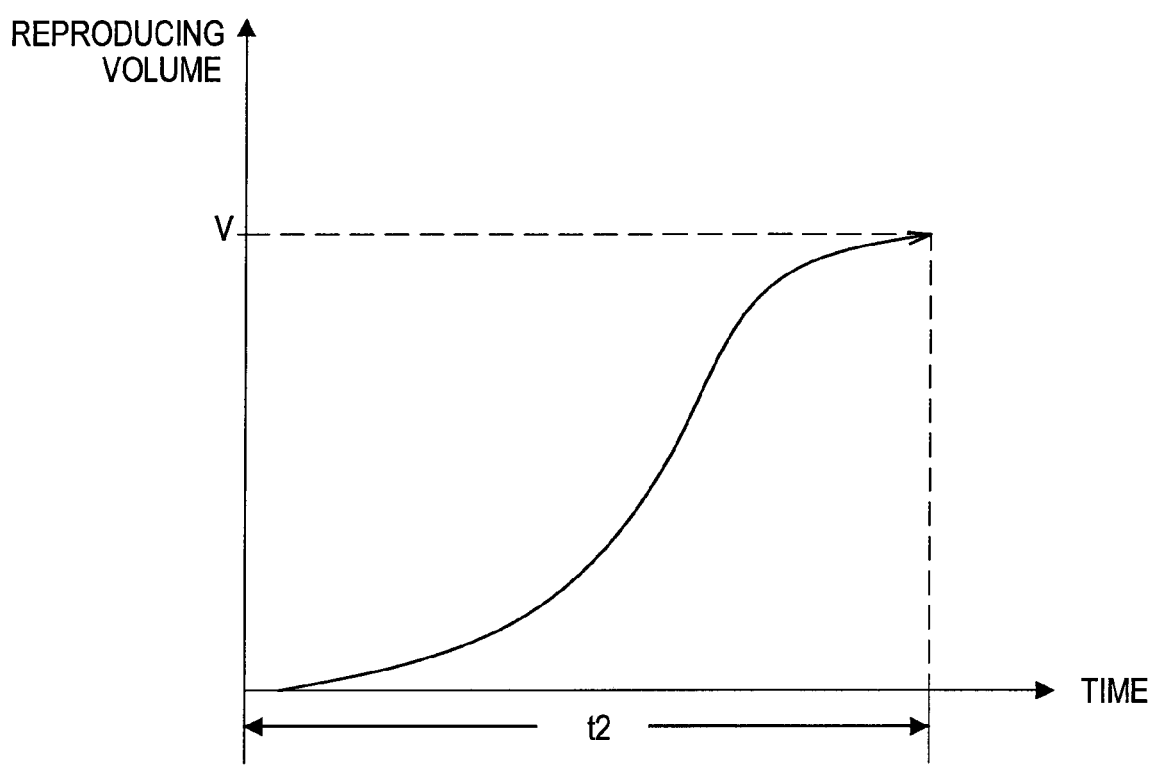
FIG. 22 is a second explanatory view for explaining a reason why the radio communication device performs a determination related to a condition C in the third reproducing method of audio data according to the embodiment of the present invention.

Further, FIG. 22 is a second explanatory view for explaining the reason why the radio communication device 21A determines regarding the condition C in the third reproducing method of the audio data according to the embodiment of the present invention audio data. Here, FIG. 22 shows the fade-in of the audio data in the radio communication device 21A with a reproducing volume axis and a time axis.

Referring to FIG. 22, it can be seen that the radio communication device 21A takes a predetermined time period t2 to fade in audio data (hereinafter, the time period taken to fade in the audio data is referred to as a "third time period"). As described above, the distance between the radio communication device 21A and other device is not always constant. Thus, when the fade-in of the second audio data is performed in step S714, the radio communication device 21A may determine that the estimated distance becomes out of the predetermined condition before the third time period t2 ends.

In this case, in the radio communication device 21A, by the above-described first reproducing method and second reproducing method, the second audio data, which is being fade in, may be fade out during the fade-in. When the second audio data is reproduced as described above, similarly to the case of the first audio data, it is difficult to deny the possibility that the user A of the radio communication device 21A feel uncomfortable.

Thus, in the third reproducing method, by using the first time period and third time period t2 which are started to be counted in step S708, the "first time period>third time period t2" is set as another condition of the condition C, for example. Since the another condition of the condition C is set as "first time period>third time period t2," the radio communication device 21A determines a completion of the fade-in of the second audio data in step S714 and can prevent flutter in changes of the reproducing volume of the second audio data.

As described above, in the third reproducing method, the reason why the radio communication device 21A makes a determination regarding the condition C and the reason of counting the first time period are to prevent flutter in changes of the reproducing volume of the first audio data and second audio data. Hereinafter, an example in which the radio communication device 21A uses the condition C as "first time period>second time period t1" and "first time period>third time period t2", for example, will be described. Note that the condition C according to the third reproducing method is not limited to the above.

Referring back to FIG. 20, the third reproducing method according to the embodiment of the present invention will be described. When it is not determined that the condition C is satisfied in step S720, the radio communication device 21A proceeds the fade-in of the second audio data in step S714 and the fade-out of the first audio data in step S716 (S722).

Then, the radio communication device 21A determines whether the fade-in of the second audio data in step S714 and the fade-out of the first audio data in step S716 are completed (S724).

When it is not determined that the fade-in of the first audio data and the fade-out of the second audio data are completed in step S724, the radio communication device 21A does not proceed the process until the fade-in of the first audio data and the fade-out are completed. Here, the radio communication device 21A can perform the process in step S724 based on the operation condition of an application for reproducing the audio data for example; however, it is not limited to the above.

Further, when it is determined that the fade-in of the first audio data or the fade-out of the second audio data is completed in step S724, the radio communication device 21A fades out the second audio data (S726). Then, similarly to step S518 in FIG. 18, the radio communication device 21A fades in the first audio data (S728) in synchronization with the fade-out of the second audio data in step S726.

By the processes in steps S726 and S728, in the radio communication device 21A, a reproduction shown in zone c of FIG. 17 is realized.

Then, the radio communication device 21A initializes the count value of the first time period that is counted in step S708 (S730) and repeats the processes from step S700.

Further, when it is determined that the condition C is satisfied in step S720, the radio communication device 21A fades out the second audio data (S726) and fades in the first audio data in synchronization (S728). Then, the radio communication device 21A initializes the count value of the first time period that is counted in step S708 (S730) and repeats the processes from step S700.

With the third reproducing method shown in FIG. 20, the radio communication device 21A can realize an audio data reproduction as shown in FIG. 17.

With the first to third reproducing methods shown in FIGS. 18 to 20, for example, the radio communication device 21A can obtain audio data from other radio communication device according to the distance between the radio communication devices and reproduce the obtained audio data by the reproducing method based on the distance between the radio communication devices.

[2-B-2] Functions of Radio Communication Device

Figure 23:
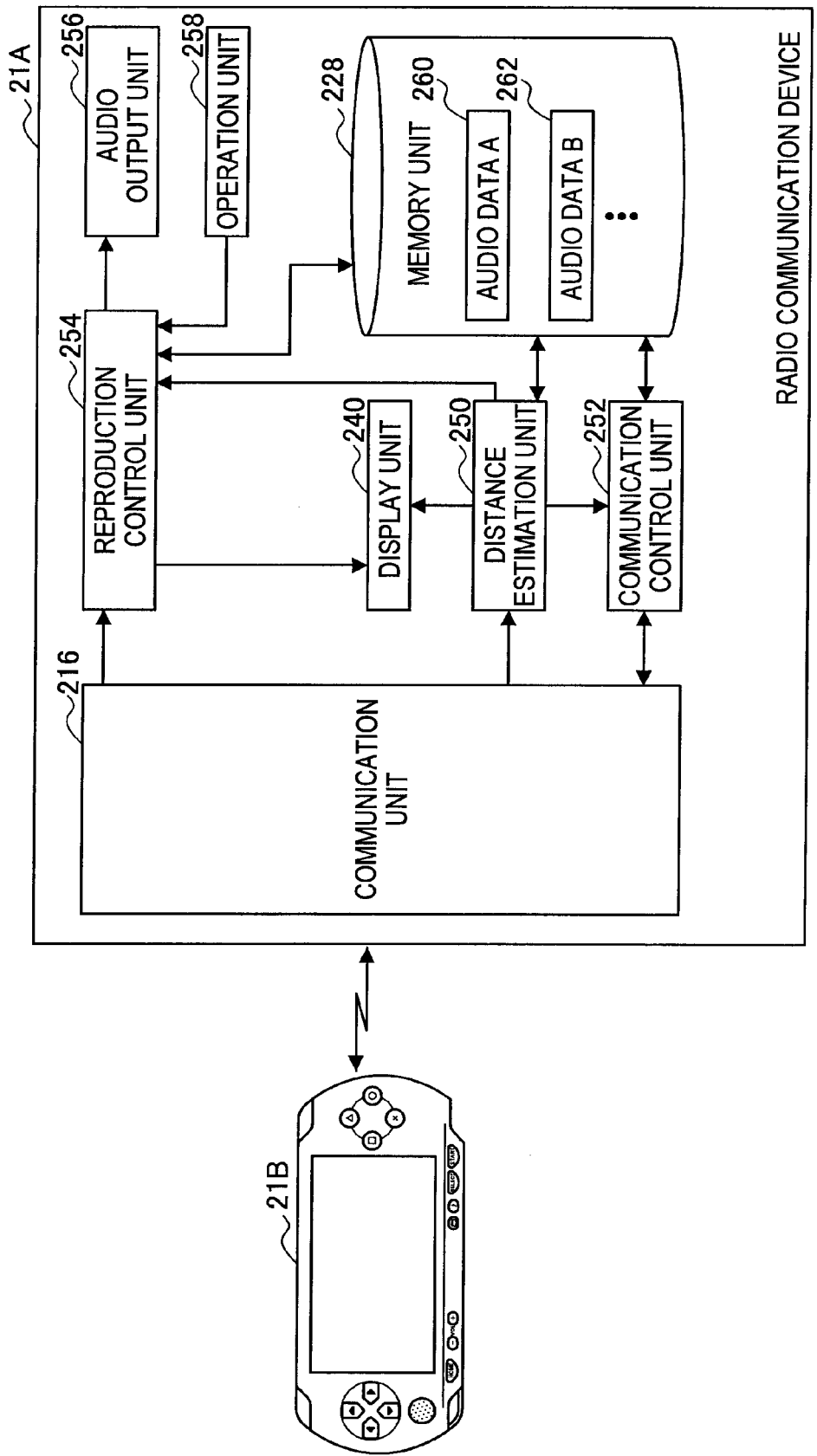
FIG. 23 is a functional block diagram showing the radio communication device according to the embodiment of the present invention.

Next, functions of the radio communication device 21A according to the embodiment of the present invention will be described. FIG. 23 is a functional block diagram of the radio communication device 21A according to the embodiment of the present invention. Here, FIG. 23 also shows the radio communication device 21B. Note that the radio communication device 21B can have a configuration same as that of the radio communication device 21A, so its description will be omitted.

Further, with a hardware configuration which is shown in FIG. 2, the radio communication device 21A can realize following functions, for example. Here, the hardware configuration shown in FIG. 2 have been described in the above [1-B-1], so its description will be omitted.

Referring to FIG. 23, the radio communication device 21A includes a communication unit 216, a memory unit 228, a display unit 240, a distance estimation unit 250, a communication control unit 252, a reproduction control unit 254, an audio output unit 256 and an operation unit 258. Further, the radio communication device 21A may include a control unit (not shown) that performs various arithmetic processes using a program for controlling and controls the entire radio communication device 21A.

The communication unit 216 is an interface for transmitting/receiving a radio signal such as a distance measurement packet or audio data to/from the other radio communication device 21B and functions as a transmission unit and a reception unit, similarly to the communication unit 216 shown in FIG. 3.

Similarly to the memory unit 228 shown in FIG. 3, the memory unit 228 stores various information related to a distance estimation such as a field intensity of a distance measurement packet, a noise floor value of the distance measurement packet and device information that is received from the communication unit 216 in advance. Further, the memory unit 228 can store first audio data. Here, FIG. 23 shows an example in which the memory unit 228 stores audio data A260, audio data B262, . . . as the first audio data.

The display unit 240 displays, for example, information of estimated distance from the radio communication device 21B on a display screen. Here, the display unit 240 can be, for example, an LCD (liquid crystal display), an OLED display (or referred to as an organic ElectroLuminescence display); however, it is not limited to the above.

The distance estimation unit 250 functions as the field intensity measurement unit 220, noise floor measurement unit 224, estimation unit 232 and determination unit 236, which are shown in FIG. 3. In other words, the distance estimation unit 250 functions to estimate a distance from other radio communication device 21B.

Similarly to the communication control unit 244 shown in FIG. 3, the communication control unit 252 has a function as a control unit for controlling a transmission of a distance measurement packet by the communication unit 216.

Further, the communication control unit 252 selectively generates an "audio data transmission request" or a "determination condition information request" to the radio communication device (external device) serving as a transmission source of the distance measurement packet based on a presence or an absence of the first audio data in a later described reproduction control unit 254 and the estimated distance estimated by the distance estimation unit 250, for example. Then, using the communication unit 216, the communication control unit 252 transmits the generated "audio data transmission request," "determination condition information request" and the like to the radio communication device serving as a transmission source of the distance measurement packet.

Further, the communication control unit 252 can transmit the first audio data stored in the memory unit 228 to the other radio communication device 21B in response to an audio data transmission request transmitted from the other radio communication device 21B.

The reproduction control unit 254 reads the first audio data from the memory unit 228, and decodes and reproduces the first audio data. Further, when the communication unit 216 receives the second audio data transmitted from the other radio communication device 21B in response to the "audio data transmission request," the reproduction control unit 254 decodes and reproduces the first audio data. In this case, the reproduction control unit 254 adjusts the reproducing volume of the first audio data and the reproducing volume of the second audio data in synchronization, for example. More specifically, the reproduction control unit 254 fades out the first audio data and fades in the second audio data. Thus, in the radio communication device 21A, a reproduction as shown in zone b of FIG. 17 is realized.

Further, when a signal which indicates that the estimated distance does not satisfy the predetermined condition any more ("estimated distance<predetermined distance M," for example) is received from the distance estimation unit 250 while the second audio data is being reproduced, the reproduction control unit 254 adjusts the reproducing volume of the first audio data and the reproducing volume of the second audio data again in synchronization, for example. More specifically, the reproduction control unit 254 fades out the second audio data and fades in the first audio data. Thus, in the radio communication device 21A, a reproduction as shown in zone c of FIG. 17 is realized.

The audio output unit 256 functions to externally transfer, as a sound, the audio data (first audio data and/or second audio data) that is decoded and reproduced by the reproduction control unit out of the radio communication device 21A. Here, as the audio output unit 256, there is an audio output circuit for transmitting audio signals to an external device such as a speaker, an earphone or a headphone, for example; however, it is not limited to the above.

The operation unit 258 is an operation means of the radio communication device 21A to accept user's predetermined operation. Since the radio communication device 21A has the operation unit 258, for example, various settings such as setting a value of the predetermined distance M and setting a selection condition of the second audio data can be performed and an operation desired by the user can be performed by the radio communication device 21A. Here, as the operation unit 258, there is an operation input device such as a keyboard and a mouse, a button, a direction key, a rotary selector such as a jog dial, or a combination thereof, for example; however, it is not limited to the above.

The radio communication device 21A can perform the above first to third reproducing methods with the configuration as shown in FIG. 23. Thus, the radio communication device 21A can obtain the audio data from other radio communication device according to the distance between the radio communication devices and reproduce the obtained audio data by the reproducing manner based on the distance between the radio communication devices.

[2-C] Conclusion

As described above, the radio communication device 21A according to the embodiment of the present invention estimates a distance from other radio communication device (external device) based on a predetermined condition related to a field intensity and a noise component of a received radio signal. Then, when the estimated distance satisfies the predetermined condition ("estimated distance<predetermined distance M," for example) while the first audio data stored in the memory unit 228 is being reproduced, the radio communication device 21A obtains second audio data from the other radio communication device according to the estimated distance. Then, the radio communication device 21A adjusts the reproducing volume of the first audio data and the reproducing volume of the obtained second audio data. Further, the radio communication device 21A can adjust the reproducing volume of the first audio data and the reproducing volume of the obtained second audio data in synchronization.

Here, since the radio communication device 21A estimates the distance based on the predetermined condition related to the field intensity and noise component of the received radio signal, the radio communication device 21A can estimate the distance between the radio communication devices in real time with higher accuracy. Thus, the radio communication device 21A can prevent "a case where audio data cannot be directly transmitted/received to/from other radio communication device to obtain or exchange audio data," which may occur in a conventional radio communication device. Further, since the radio communication device 21A can estimate the distance between the radio communication devices in real time with higher accuracy, the audio data can be reproduced by the reproducing manner appropriate to the actual distance between the radio communication devices.

Further, as an embodiment of the present invention of the present invention, the radio communication device 21A has been described; however the embodiment of the present invention is not limited to this example. For example, the embodiment of the present invention can be applied to a device having an audio data reproduction function and a radio communication function, including a music player such as WALK MAN®, a portable video processor, a computer such as a UMPC (Ultra Mobile Personal Computer), a mobile communication device such as a mobile phone, a portable game machine such as PlayStation Portable® and the like.

[Application Example of Radio Communication Device According to Embodiment of Present Invention]

First Application Example

As a radio communication device according to the embodiment of the present invention, an example in which the reproducing volume of audio data is adjusted based on an estimated distance between radio communication devices has been described. However, the subject to be controlled based on the estimated distance between the radio communication devices by the radio communication device according to the embodiment of the present invention is not limited to the reproducing volume of audio data. For example, the radio communication device according to the first application example of the embodiment of the present invention can perform various mixing processes such as setting the first audio data to one channel and setting the second audio data to other channel based on the estimated distance.

Second Application Example

Further, the subject to be controlled by the radio communication device according to the embodiment of the present invention based on the estimated distance between radio communication devices is not limited to audio data.

Figure 24:
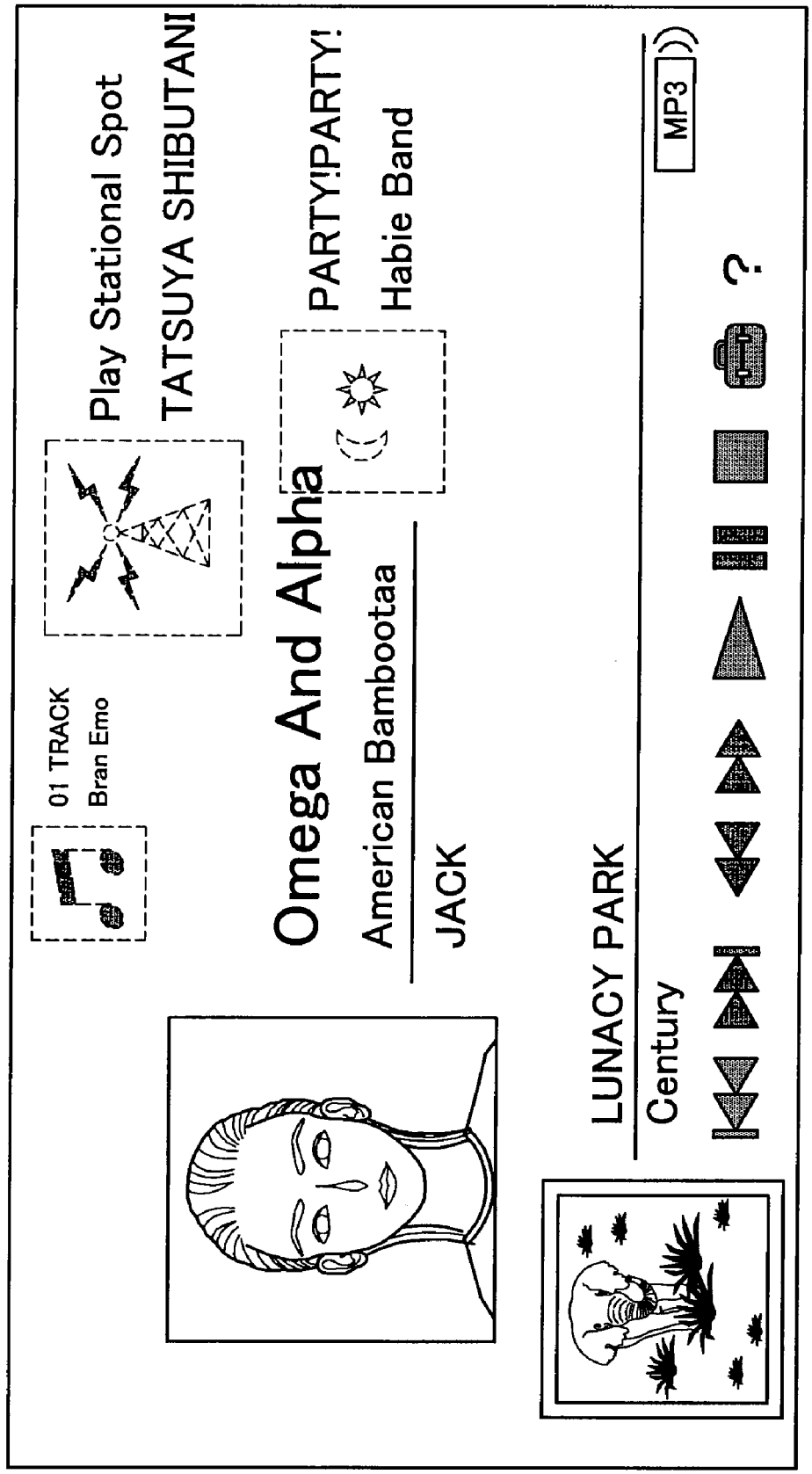
FIG. 24 is an explanatory view showing an application example of the radio communication device according to the embodiment of the present invention.

FIG. 24 is an explanatory view showing an example of an application of the radio communication device according to the embodiment of the present invention. As shown in FIG. 24, the radio communication device according to the second application example of the embodiment of the present invention can obtain image data from other radio communication device and change the manner for displaying moving images/still images corresponding to the obtained image data based on the estimated distance. Here, as the manner for displaying based on the estimated distance, there is a display in a display size according to the estimated distance, a display which an alpha blending value is set according to the estimated distance, a display providing a sense of greater depth according to the estimated distance, or a combination thereof; however, it is not limited to the above.

Similarly to the above-described radio communication device 21A, the radio communication device according to the second application example of the embodiment of the present invention can estimate the distance between radio communication devices in real time with higher accuracy. Thus, the radio communication device according to the second application example of the embodiment of the present invention can prevent "a case where image data cannot be directly transmitted/received to/from other radio communication device to obtain or exchange image data" which may occur in a conventional radio communication device. Further, the radio communication device according to the second application example of the embodiment of the present invention can display image data with a manner for displaying according to the actual distance between radio communication devices.

Program According to Embodiment of Present Invention

With a program controlling a computer to function as a radio communication device according to the embodiment of the present invention, audio data can be obtained from other radio communication device according to a distance between the radio communication devices and reproduce the obtained audio data by a reproducing manner based on the distance between the radio communication devices.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, according to the above [1], an example in which the estimation unit 232 estimates the distance from the radio communication device 20' as a long distance, a medium distance or a short distance has been described; however, the embodiments of the present invention are not limited to this example. For example, the estimation unit 232 may estimate the distance from the radio communication device 20' by the meter (m).

Further, in the above [1], an example in which the determination unit 236 performs filtering based on noise floors has been described; however, the embodiments of the present invention are not limited to this example. For example, the determination unit 236 may perform filtering based on the size of noise component such as an S/N ratio of a distance measurement packet.

Further, the respective steps of the processes of the radio communication device according to the embodiment of the present invention shown in FIGS. 13 to 15 and 18 to 20 are not needed to be processed on the time series as following the order shown in the flowcharts. For example, the respective steps of the processes of the radio communication device according to the embodiment of the present invention may include processes performed in parallel or individually (a parallel processing or a process by an object, for example).

Further, a computer program which controls the hardware included in the radio communication device according to the embodiment of the present invention such as the CPU 201, ROM 202 and RAM 203 to function relevant to the respective configurations of the radio communication device according to the embodiment of the present invention may be provided. Further, a memory for storing the computer program is provided. Further, when the respective function blocks shown in the functional block diagrams of FIGS. 3 and 23 are composed of hardware, the series of processes can be performed by the hardware.

The above-described configuration is one example of the embodiment of the present invention and obviously within the technical range of the present invention.

The invention claimed is:

1. A radio communication device comprising:
a communication unit that performs radio communication with an external device;
a memory unit capable of storing first audio data;
a distance estimation unit that estimates a distance from the external device serving as a transmission source which transmits a radio signal based on a predetermined condition related to a field intensity and a noise component of the radio signal received by the communication unit;
a communication control unit that controls the communication unit to transmit an audio data transmission request to the external device serving as the transmission source based on the estimated distance estimated by the distance estimation unit, when the first audio data stored in the memory unit is being reproduced; and
a reproduction control unit that adjusts a reproducing volume of the first audio data and a reproducing volume of second audio data that is decoded from a radio signal, when the first audio data stored in the memory unit is being reproduced and the communication unit receives the radio signal corresponding to the second audio data transmitted from the external device serving as the transmission source in response to the transmission request.

2. The radio communication device according to claim 1, wherein the distance estimation unit includes
a measurement unit that measures the field intensity of the radio signal,
a determination unit that determines whether the radio signal satisfies the predetermined condition related to the noise component, and
an estimation unit that estimates the distance from the external device based on a determination result by the determination unit and the field intensity measured by the measurement unit.

3. The radio communication device according to claim 2, wherein the determination unit determines that the predetermined condition is satisfied, when the noise component of the radio signal is greater than a lower limit set value and lower than an upper limit set value.

4. The radio communication device according to claim 3, wherein, in response to a reception of a radio signal in the communication unit, the communication control unit controls the communication unit to transmit a radio signal addressed to the external device serving as the transmission source which transmits the radio signal.

5. The radio communication device according to claim 3, wherein the communication unit receives device information indicating a transmitting power of the radio signal of the external device, which is transmitted from the external device, and
wherein the estimation unit estimates the distance from the external device serving as the transmission source of the radio signal using the device information.

6. The radio communication device according to claim 5, wherein the estimation unit
calculates an average value of field intensities of radio signals which are determined to satisfy the predetermined condition by the determination unit,
determines in which of defined average value ranges the average value is included, and
determines that the distance from the external device serving as the transmission source of the radio signal to be a distance corresponding to the average value range which is determined to include the average value.

7. The radio communication device according to claim 6, wherein the average value ranges and an average value calculation vary by the device information.

8. The radio communication device according to claim 5, wherein the device information indicates a transmitting power of the radio signal of the external device serving as the transmission source of the radio signal or a type of the external device serving as the transmission source of the radio signal.

9. The radio communication device according to claim 1, wherein, when the communication unit receives a radio signal corresponding to the second audio data in response to the transmission request, the reproduction control unit adjusts the reproducing volume of the first audio data to gradually turn down in a predetermined period of time and adjusts the reproducing volume of the second audio data to gradually turn up in a predetermined period of time in synchronization with the adjustment of the reproducing volume of the first audio data.

10. The radio communication device according to claim 9, wherein, when the estimated distance from the external device which transmits the second audio data becomes greater than a predetermined threshold value, the reproduction control unit adjusts the reproducing volume of the first audio data to gradually turn up in a predetermined period of time and adjusts the reproducing volume of the second audio data to gradually turn down in a predetermined period of time in synchronization with the adjustment of the reproducing volume of the first audio data.

11. The radio communication device according to claim 10,
wherein the reproduction control unit
measures a first time period in a case where the estimated distance from the external device which transmits the second audio data is shorter than the predetermined threshold value,
compares the measured first time period with a second time period taken to adjust the reproducing volume of the first audio data and with a third time period taken to adjust the reproducing volume of the second audio data, when the estimated distance from the external device which transmits the second audio data becomes greater than the predetermined threshold value, and
adjusts the reproducing volume of the first audio data and the reproducing volume of the second audio data, if the first time period is longer than the second time period and than the third time period.

12. The radio communication device according to claim 1, wherein the reproduction control unit adjusts the reproducing volume of the first audio data and the reproducing volume of the second audio data in synchronization with each other.

13. The radio communication device according to claim 1, wherein the reproduction control unit adjusts the reproducing volume of the first audio data to gradually turn down in a predetermined period of time, when the communication unit receives a radio signal corresponding to the second audio data in response to the transmission request.

14. The radio communication device according to claim 1, wherein the reproduction control unit adjusts the reproducing volume of the second audio data to gradually turn up in a predetermined period of time.

15. The radio communication device according to claim 1, wherein the communication control unit
controls the communication unit to transmit a request for determination condition information to selectively transmit the transmission request, and
controls the communication unit to selectively transmit the audio data transmission request based on the estimated distance estimated by the distance estimation unit and the determination condition information transmitted from the external device in response to the request for the determination condition information.

16. The radio communication device according to claim 1, wherein, when the distance estimation unit estimates respective distances from a plurality of external devices, the communication control unit controls to selectively transmit the transmission request to one of the plurality of external devices based on the estimated distance estimated by the distance estimation unit.

17. An audio data reproducing method applicable to a radio communication device including a communication unit for performing radio communication with one or more external devices and a memory unit for storing first audio data, comprising the steps of:
receiving a radio signal transmitted from the external device;
estimating a distance from the external device serving as a transmission source which transmits the radio signal based on a predetermined condition related to a field intensity and a noise component of the radio signal received in the step of receiving;
transmitting an audio data transmission request addressed to the external device serving as the transmission source based on the estimated distance estimated in the step of estimating, when the first audio data stored in the memory unit is being reproduced, and
adjusting a reproducing volume of the first audio data and a reproducing volume of second audio data decoded from the radio signal, when the communication unit receives the radio signal corresponding to the second audio data transmitted from the external device serving as the transmission source in response to the transmission request transmitted in the step of transmitting.

18. A program applicable to a radio communication device including a communication unit for performing radio communication with one or more external devices and a memory unit for storing first audio data, the program for causing a computer to perform the steps of:
receiving a radio signal transmitted from the external device;
estimating a distance from the external device serving as a transmission source which transmits the radio signal based on a predetermined condition related to a field intensity and a noise component of the radio signal received in the step of receiving;
transmitting an audio data transmission request addressed to the external device serving as the transmission source based on the estimated distance estimated in the step of estimating, when the first audio data stored in the memory unit is being reproduced, and
adjusting a reproducing volume of the first audio data and a reproducing volume of second audio data decoded from the radio signal, when the communication unit receives the radio signal corresponding to the second audio data transmitted from the external device serving as the transmission source in response to the transmission request transmitted in the step of transmitting.

* * * * *

UNITED STATES PATENT AND TRADEMARK OFFICE
CERTIFICATE OF CORRECTION

PATENT NO. : 8,320,837 B2
APPLICATION NO. : 12/741541
DATED : November 27, 2012
INVENTOR(S) : Michinari Kohno et al.

Page 1 of 1

It is certified that error appears in the above-identified patent and that said Letters Patent is hereby corrected as shown below:

On the Title Page, in Item (73) Assignee, insert the following missing data from Item (73) Assignee section before "Sony Computer Entertainment Inc., Tokyo (JP),":

--Sony Corporation, Tokyo (JP);--

Signed and Sealed this
Fifteenth Day of October, 2013

Teresa Stanek Rea
*Deputy Director of the United States Patent and Trademark Office*